(12) United States Patent
Yonemochi et al.

(10) Patent No.: US 7,837,918 B2
(45) Date of Patent: Nov. 23, 2010

(54) METHOD OF FORMING A COATING LAYER ON THE SURFACE OF A MOLDED PRODUCT WITHIN A MOLD

(75) Inventors: Kenji Yonemochi, Komaki (JP); Yoshiaki Yamamoto, Iwakura (JP); Kenji Oota, Iwakura (JP); Toshio Arai, Ube (JP); Etsuo Okahara, Ube (JP); Kazuaki Kobayashi, Yoshiki-gun (JP)

(73) Assignees: Dai Nippon Toryo Co., Ltd., Osaka (JP); Ube Machinery Corporation, Ltd., Ube-shi (JP)

( * ) Notice: Subject to any disclaimer, the term of this patent is extended or adjusted under 35 U.S.C. 154(b) by 0 days.

(21) Appl. No.: 12/285,441

(22) Filed: Oct. 6, 2008

(65) Prior Publication Data

US 2009/0121385 A1 May 14, 2009

Related U.S. Application Data

(62) Division of application No. 11/280,267, filed on Nov. 17, 2005, which is a division of application No. 10/030,126, filed as application No. PCT/JP00/04779 on Jul. 17, 2000, now abandoned.

(30) Foreign Application Priority Data

| Jul. 27, 1999 | (JP) | ................................. 11-212097 |
| Jul. 28, 1999 | (JP) | ................................. 11-213829 |
| Jul. 28, 1999 | (JP) | ................................. 11-213830 |
| Jul. 28, 1999 | (JP) | ................................. 11-213831 |
| Nov. 17, 1999 | (JP) | ................................. 11-326839 |

(51) Int. Cl.
*B29C 33/10* (2006.01)

(52) U.S. Cl. .......................... 264/255; 425/96; 425/120; 425/130

(58) Field of Classification Search ................. 264/255; 425/812, 96, 120, 130
See application file for complete search history.

(56) References Cited

U.S. PATENT DOCUMENTS 4,076,788 A 2/1978 Ditto (Continued)

FOREIGN PATENT DOCUMENTS

DE 2461925 11/1975

(Continued)

OTHER PUBLICATIONS

European Patent Office Communication and Supplementary European Search Report for corresponding European Patent Application 00946363.9 dated Feb. 20, 2003.

(Continued)

*Primary Examiner*—Kat Wyrozebski
*Assistant Examiner*—Robert J Grun
(74) *Attorney, Agent, or Firm*—Edwards Angell Palmer & Dodge LLP

(57) ABSTRACT

An in-mold coating method providing a mold having a specifically formed auxiliary cavity and an in-mold coating formation method which employs said mold, so that it is possible to prevent a coating material from leaking out of the mold, thereby shortening the molding formation cycle, and making it possible to manufacture a molded product having a stabilized quality. In addition, by using a mold having a specifically shaped sub-cavity, there is provided a still further in-mold coating formation method which can keep mold temperature at a relatively low value, cause the coating material to cure at a predetermined temperature and within a predetermined time period thereby shortening the molding formation cycle, improving the productivity, improving the physical properties of a coating layer, thus obtaining a good molded product.

2 Claims, 13 Drawing Sheets

U.S. PATENT DOCUMENTS

| | | | |
|---|---|---|---|
| 4,081,578 A | 3/1978 | van Essen et al. | |
| 4,207,049 A | 6/1980 | Malo et al. | |
| 4,239,796 A | 12/1980 | Shanoski et al. | |
| 4,331,735 A | 5/1982 | Shanoski | |
| 4,366,109 A | 12/1982 | Svoboda | |
| 4,438,062 A | 3/1984 | Griffith et al. | |
| 4,555,087 A * | 11/1985 | Wallner et al. | 249/78 |
| 4,668,460 A | 5/1987 | Ongena | |
| 4,900,242 A | 2/1990 | Maus et al. | |
| 5,143,736 A | 9/1992 | Kumamura et al. | |
| 5,174,933 A | 12/1992 | Toh et al. | |
| 5,547,619 A | 8/1996 | Obayashi et al. | |
| 5,902,534 A * | 5/1999 | Fujishiro et al. | 264/255 |
| 6,180,043 B1 | 1/2001 | Yonemochi et al. | |

FOREIGN PATENT DOCUMENTS

| | | |
|---|---|---|
| EP | 0197496 | 10/1986 |
| EP | 0533418 | 3/1993 |
| EP | 0733668 | 9/1996 |
| EP | 0795386 | 9/1997 |
| EP | 0934808 A2 | 8/1999 |
| FR | 2270086 | 12/1975 |
| FR | 2547706 | 12/1984 |
| GB | 1474148 | 5/1977 |
| JP | 54-036369 | 3/1979 |
| JP | 54-139962 | 10/1979 |
| JP | 55-065511 | 5/1980 |
| JP | 57-000140 | 1/1982 |
| JP | 60-221437 | 11/1985 |
| JP | 61-273921 | 12/1986 |
| JP | 62-134223 | 6/1987 |
| JP | 1-005653 | 1/1989 |
| JP | 64-19325 | 1/1989 |
| JP | 1229605 | 9/1989 |
| JP | 03-101913 | 4/1991 |
| JP | 03-178412 | 8/1991 |
| JP | 05-070712 | 3/1993 |
| JP | 05-148375 | 6/1993 |
| JP | 05-082515 | 11/1993 |
| JP | 05-293863 | 11/1993 |
| JP | 05-301251 | 11/1993 |
| JP | 05-318527 | 12/1993 |
| JP | 06-107750 | 4/1994 |
| JP | 06-254886 | 9/1994 |
| JP | 06-270180 | 9/1994 |
| JP | 6-325805 | 11/1994 |
| JP | 06-328503 | 11/1994 |
| JP | 06-328504 | 11/1994 |
| JP | 06-328505 | 11/1994 |
| JP | 07-100893 | 4/1995 |
| JP | 07-112450 | 5/1995 |
| JP | 07-290504 | 11/1995 |
| JP | 08-113761 | 5/1996 |
| JP | 08-127893 | 5/1996 |
| JP | 08-142119 | 6/1996 |
| JP | 08-309789 | 11/1996 |
| JP | 09-048044 | 2/1997 |
| JP | 09-052253 | 2/1997 |
| JP | 09-052257 | 2/1997 |
| JP | 09-052262 | 2/1997 |
| JP | 2607112 | 2/1997 |
| JP | 09-076278 | 3/1997 |
| JP | 09-076285 | 3/1997 |
| JP | 11-010695 | 1/1999 |
| JP | 11-277577 | 10/1999 |
| JP | 2000-141407 | 5/2000 |
| WO | WO-95/13177 | 5/1995 |

OTHER PUBLICATIONS

H. H. Winter; XP-001058455; Can the Gel Point of a Cross-linking Polymer Be Detected by the G'-G" Crossover?; Polymer Engineering and Science; vol. 27, No. 22; pp. 1698-1702; Dec. 1987.

European Office Action dated Nov. 18, 2004.

International Search Report dated Oct. 10, 2000, issued on PCT/JP00/04779.

* cited by examiner (a)  (b)

RESIN MOLDING    MOLD OPENING    COATING MATERIAL INJECTION    MOLD CLOSING

METHOD OF FORMING A COATING LAYER ON THE SURFACE OF A MOLDED PRODUCT WITHIN A MOLD

This application is a divisional application of U.S. application Ser. No. 11/280,267, filed Nov. 17, 2005 which is a divisional application of prior application Ser. No. 10/030,126 filed Jan. 24, 2002, which is a National Stage of International Application No. PCT/JP00/04779 filed Jul. 17, 2000, and claims the right of priority under 35 U.S.C. §119 based on Japanese Patent Application Nos. 11-212097 filed Jul. 27, 1999, 11-213829 filed Jul. 28, 1999, 11-213830 filed Jul. 28, 1999, 11-213831 filed Jul. 28, 1999 and 11-326839 filed Nov. 17, 1999, which is hereby incorporated by reference herein in its entirety as if fully set forth herein.

TECHNICAL FIELD

The present invention relates to an in-mold coating formation method in which a thermoplastic resin molded product is molded in a mold, subsequently a coating material is injected into the mold to form a coating layer on the surface of thus obtained thermoplastic resin molded product. This invention also relates to an in-mold coating formation apparatus for use in the in-mold coating formation method for forming a coating layer on the surface of a molded product within a mold. This invention further relates to an in-mold coating formation mold for use in the in-mold coating formation apparatus and also relates to an in-mold coating formation method which utilizes the in-mold coating formation mold formed for use in the in-mold coating formation apparatus.

BACKGROUND ART

There have been proposed in-mold coating formation methods, aiming at improving a quality of products by adding some additional values such as decorative effects on some thermoplastic resin molded products often used in automobiles and house hold electric apparatus or devices or used as construction materials, or aiming at reducing the production cost by omission of certain steps in molding process thereof; said in-mold coating formation method comprises the steps of injecting a coating material into a space between the surface of a thermoplastic resin molded product formed in a mold and the internal surface of the cavity of the mold, and then curing the coating material within the mold so as to obtain an integrally formed molded resin product on whose surface a coating layer is adhered. In particular, those methods have been used to certain extent in the production of the thermoplastic resin products used as various parts in an automobile vehicle whose requirements as to the appearance and the quality are quite severe. These parts may include a bumper, a sideview mirror cover, a fender, a door panel, a back door panel, an over fender, a door handle, a side garnish, a side protector, a wheel cap, including a side cover and a cowl for use in a motorcycle.

There have been known several in-mold coating formation methods, such as those disclosed in U.S. Pat. No. 4,076,788, U.S. Pat. No. 4,081,578, U.S. Pat. No. 4,331,735, U.S. Pat. No. 4,366,109, U.S. Pat. No. 4,668,460, JP-A-5-301251, JP-A-5-318527, and JP-A-8-142119.

In the case of methods disclosed therein, there are some prescriptions as to the mold closing force at the time when a coating material is injected into the space between the inner surface of the mold and the thermoplastic resin molded product after formation of the molded products from the thermoplastic resin material for molding within the mold, the injection pressure of the coating material, and a mold clearance. However, there is almost no attention to be paid to time required for injecting a coating material and the time required for completing the reclosing of the mold after the coating material has been injected into the mold.

Namely, a thermosetting material starts its solidification by virtue of a heat of the inner surface of the mold and a heat of the thermoplastic resin material immediately after it is injected into a mold. A curing speed thereof will vary from case to case, depending upon various conditions such as the sort of a coating material, the temperature of a mold, the temperature of a thermoplastic resin material, and the like.

If the coating material injection time is too short, pigment components contained in a coating material will be undesirably separated from each other in the coating material or some weld lines will be undesirably formed. On the other hand, if the coating material injection time lasts too long, an end portion of the molded product is often not coated since a flowability of a coating material will decrease with the progress of the solidification of the coating material, and/or some wrinkles and cracks will be formed in a coating layer.

Moreover, if an operation time until the completion of the reclosing of the mold is too long, the coating material will undergo an undesired gel with the progress of its solidification, resulting in a decrease in its flowability and hence making it difficult for a coating material to cover an entire molded resin product including its end portions, and/or a pressure needed in reclosing the mold will also be applied to the coating material during its gel, causing some wrinkles and cracks in the cured coating layer formed on the surface of the molded resin product. On the other hand, if an operation time before the completion of the reclosing of the mold is too short, pigment components contained in the coating material will be undesirably separated from each other in the coating material, and some weld lines will be undesirably formed, making it impossible to produce molded resin products having a uniform appearance. Further, in the case of molded products having ribs and bosses, if a pressure for reclosing the mold is not made proper, some defects such as sinks and humps (which are in fact tubercles formed on the surface of thick portions of the molded product) will be formed in the molded products.

For this reason, firstly, it is earnestly desired at the present time to establish an improved in-mold coating formation method which requires that after a thermoplastic resin product has been formed within a mold, a coating material is injected into the mold to form a coating layer on the surface of the molded resin product, with the coating formation process being carried out without forming any wrinkles, cracks, mottles, and weld lines in the cured coating layer, thereby obtaining molded resin products having a coating layer of a high quality.

Further, the above mentioned in-mold coating formation method (hereinafter it is referred to sometimes as IMC method) has attracted a considerable attention from people in the art and has been considered to be very effective to serve as a substitution for a conventional spray coating technique; this is because there is a tendency that official restrictions for controlling the discharge of harmful organic compounds from various factories into surrounding atmosphere become more and more severe, and from the viewpoints that serious attention should be paid to the health protection of workers working in the factories under the circumstances that environment problems have attracted big concerns more and more during recent years.

Incidentally, the above mentioned IMC method was initially developed mainly for use in manufacturing a molded resin product from a thermosetting resin such as SMC or BMC. However, in recent years, attempts have been made to apply an IMC method to form an thermoplastic resin product. For example, as is disclosed in JP-A-5-301251, there has been proposed a method comprising injecting a coating material of a thermosetting resin onto the surface at the injection inlet of a molded resin product by altering a closing force of the mold, or maintaining a closing force of the mold at a constant level, under a condition where the surface temperature of a resin is equal to or higher than the curing temperature of a coating material, and opening the mold after the coating material has been cured.

However, it is difficult to design optimum molding conditions for a formed coating layer to obtain a good appearance and a good adhesion strength, compared with an IMC method for a thermosetting resin from the following reasons or the like: a mold temperature in an IMC method for a thermoplastic resin will be fairly lower than that in an IMC method for a thermosetting resin; and, in the case of a coating material for a thermoplastic resin in an IMC method. it is required to have a curing property capable of curing at a temperature lower than a coating material for a thermosetting resin does.

Further, a conventional injection molding machine is designed only for molding a resin product having a predetermined shape, but not for carrying out an IMC method. Therefore, one may point out the point, as one of reasons making it difficult to use an IMC method of a thermoplastic resin, that the conventional injection molding machine is designed not so as to carry out the controls of the position of a mold and the mold closing force with a high precision and a high response. That is, it is impossible to spread a coating material sufficiently within the cavity of a mold after the injection thereof into the mold, or it is extremely difficult to obtain a uniform coating layer since an injected coating material starts to cure partially soon after it has been injected into the mold. Accordingly, even if in a case where the method disclosed in JP-A-5-301251 is used, it is difficult to control the curing condition for curing the coating material, as far as a conventional injection molding machine is used whose control operation for controlling the mold closing force and mold position is slow, hence rendering it difficult to ensure a high productivity.

Therefore, in order to improve the above mentioned situation, JP-A-6-254886 has proposed an attempt to adjust conditions for an IMC method by giving a predetermined amount of opening of the mold. However, in the case of the IMC apparatus for this method, there is employed a means for stopping at a position capable of ensuring a predetermined amount of opening of the mold as a result of the interaction between two sets of the driving means installed in the opposite direction each other, by installing another driving means for driving the mold in the opposite site in addition to a driving means for effecting the opening or closing of a mold. Accordingly, the control system thereof is complex and it is difficult to ensure a high response. This brings inherently a problem that it is impossible to shorten an operation time which lasts until the mold arrives at its predetermined stop position.

Moreover, with regard to an injection molding machine of a hydraulic direct press type which has been used in prior art, since a mold closing force control for controlling a mold pressing force and a mold opening amount control for controlling the mold position are effected by different control systems, although very slightly, a time lag will occur when the mold position control is changed over to the mold closing force control, making it impossible for the mold to be suitable for a continuous operation. As a result, with regard to an IMC method that is carried out in an injection molding machine of a hydraulic direct press type, at the time when the operation of the mold is interrupted, some flow lines will occur in coating material flowing areas within the cavity of a mold. Namely, there has been existing a problem that the conventional injection molding machine of the hydraulic direct press type is not suitable for carrying out an in-mold coating formation method which requires that the mold closing force and the mold opening amount be controlled continuously. In conclusion, there was only a low yield even if people tried their best to manufacture a thermoplastic resin molded product coated with a properly formed coating layer.

Because of the reasons stated in the above, it has been strongly demanded to develop an improved in-mold coating formation method and an improved in-mold coating formation apparatus, which are able to control a mold closing force and a mold opening amount with a high precision and a high response even under a condition where the mold closing force and the mold opening amount are required to be continuously changed, so as to greatly enlarge a selectable range for selecting suitable manufacturing conditions for carrying out an IMC method for a thermoplastic resin so as to produce an integrally formed resin product being excellent in the appearance and the adhesion strength of its coating layer.

However, as discussed in the above, although the conventional IMC method is utilized partly only for the manufacture of a molded product from a thermosetting resin such as SMC resin and BMC resin, this method has been not utilized widely yet for an injection molding of a thermoplastic resin. A key reason for this, one may point out one problem that the coating material often leaks out of the mold. In particular, since it is not easy to carry out an operation to remove coating material leaked from the mold, and since the injection molding machine has to be stopped at every time when the coating material is leaked, a cycle for the formation of a molded product will become too long, hence resulting in a low productivity. Moreover, since the leaked coating material can form an additional load during a process in which a mold is being closed, a predetermined mold closing force will become insufficient, causing a problem that the leaked coating material will adhere to a molded product to be produced in a next production cycle, thus making it difficult to constantly maintain a good quality for molded resin products.

In order to cope with the leakage problem of a coating material, JP-A-6-328505 has proposed an improved mold for use in an injection molding process, in which the shear edge portion(s) is(are) formed so as to prevent a coating material from leaking out the mold, while utilizing parting surfaces. However, since it is still impossible to completely prevent a leakage of a coating material even if this type of the mold is employed, an internal space is required to be formed within the mold for storing the leaked coating material. Consequently, since it is necessary to perform an operation to remove the coating material accumulated in the shear edge portion(s) and this internal space, it is considered that this is the cause of reducing the productivity.

In addition, there is proposed in JP-A-9-48044 a mold having parting surfaces wherein an auxiliary cavity is arranged in parallel with the parting surfaces in order to prevent a possible leakage of a coating material. However, in the case that this type of the mold is used, the coating material can be injected into the mold only under the state where the mold is closed.

Further, the said publication also discloses another mold having grooves formed within the auxiliary cavity. However, such grooves are required to have a thickness of 0.1 to 0.5 mm not so as to make a coating material leaked into a clearance (a gap formed between a groove-forming rib area and a mold cavity surface) formed due to a curing shrinkage of a resin material used for molding. One may not allow, however, to have a sufficient height in the case of the grooves having such a thickness due to the requirements in the strength of the mold movement. Consequently, if a coating material is injected into the mold by opening it at a predetermined opening amount, a coating material will be leaked. On the other hand, even if the grooves are made higher than the opening amount of the mold, there is still a possibility that the grooves are not durable enough in their strength against an injection pressure of coating material.

Moreover, there is disclosed in JP-A-9-52262 a mold being formed with a recess portion located surrounding an opening portion (sprue portion) of a molten resin injecting section, so as to prevent a coating material from flowing into the sprue portion. However, similar to an invention disclosed in JP-A-9-48044, when a coating material is injected into a mold opening it at a predetermined amount, it is considered that the effect of preventing a possible leakage of a coating material is small.

That is, thirdly, there is a strongly desire to provide an in-mold coating formation mold which is capable of preventing a coating material from leaking out of the mold and an in-mold coating formation method using the same, so as to shorten the formation cycle of each molded product and at the same time to stabilize the product quality.

Moreover, in an IMC method for a thermosetting resin, a mold to be used is mainly a shear edge type mold. This is because the coating material is prevented from flowing out of the mold cavity at the time of injecting subsequently the coating material since the thermosetting resin will exhibit so good flowability at the early stage of the molding that the resin material can fill the clearance within the shear edge portion(s).

On the other hand, in an IMC method for a thermoplastic resin, although there has been used an injection molding process suitable for molding a thermoplastic resin, most of the molds for use in the method are flat parting type molds not having shear edge portions.

However, in the case when this flat parting type mold is used, parting surfaces of the mold are not sealed by a previously injected resin to be used for molding, so that the sealing of a coating material at the end portions of a mold cavity is not sufficient. As a result, since the coating material will leak from the mold cavity, one may not keep the coating material at end portion of the mold under a high pressure. Accordingly, there has been such a problem that the quality of the coating layer of an integrally formed molded product is injured. This is because the adhesion strength between the coating material and an thermoplastic resin molded product is reduced due to the insufficient pressure at the vicinity of the end portions of the integrally formed molded resin product, in the case of the IMC method for a thermoplastic resin by using a conventional flat parting mold as mentioned above.

In order to solve the above problem associated with the above IMC method for a thermoplastic resin, there has been employed such a practice that there is used a special coating material containing a component having an excellent affinity with a thermoplastic resin, or a modified special grade resin, so as to cover the insufficiency in the adhesion strength of a coating material. However, there has been a problem that the development of a special coating material and a special grade resin not only needs a long time and a considerable expense. Additionally, it has been found to be impossible to completely remove the insufficiency of the adhesion strength of a coating material.

In addition, since a conventional hydraulic direct press type injection molding machine using a hydraulic cylinder has not been so designed to be able to carry out the IMC method, it is difficult to perform a delicate position control on a mold. Further, since the driving speed of the mold is slow, it is difficult to control operating conditions lasting from the injection of the coating material to the curing thereof. Thus, the above-mentioned may be considered to be one of the factors making it difficult to molding of a thermoplastic resin by the IMC method.

That is, fourthly, it has been demanded to provide an IMC method which is capable of producing an integrally formed molded resin product having an improved adhesion strength between a coating layer and the molded resin product formed by a thermoplastic resin material.

As discussed in the above, in recent years there have been tried attempts so as to use an IMC method for molding a thermoplastic resin material. For example, JP-A-5-301251 has proposed a method which comprises injecting a thermosetting coating material on to the surfaces to be coated by changing a mold closing force, or holding the same mold closing force, under a condition where a resin surface temperature and a mold temperature are all equal to or higher than the curing point of a coating material, opening the mold once the coating material has been cured.

Further, JP-A-5-301251 has disclosed the use of an IMC method which is similar to a common injection molding process, involving a step of injecting a molten resin at a temperature of 280° C. into the cavity of a mold, and using a coating material whose curing temperature is at about 130° C. after the mold temperature is made to 130° C. In fact, the curing temperature of a coating material varies one from another depending upon the nature of each coating material. However, if the mold has to be set at a temperature which is equal to or higher than the curing temperature of a coating material, the heating of the mold and a heating means will become too large in their scales, resulting in a high equipment cost and a high equipment running cost. Further, if a mold is used at such a high temperature, there is a fear that the mold will quickly become deteriorated in its quality.

Particularly, as in the method disclosed in JP-A-5-301251, if a mold is at a high temperature, a thermoplastic resin molded product will be in its soft state. Accordingly, it is necessary that a molded resin product be taken out from the mold only after it has been cooled to a temperature at which its shape can be exactly maintained. In this manner, if the resin molding process involves repeated cooling and heating treatments, a time period needed for one cycle molding process will become too long, hence resulting in a low productivity. In view of the above various problems, not only it is difficult to expect a high productivity by using the method disclosed in JP-A-5-301251, but also one may expect a high cost from equipment-wise and production step-wise.

In order to improve a low productivity resulted from the use of a high temperature mold, such as in the case which involves the use of a conventional method disclosed in JP-A-5-301251, the actual situation at present remains such a condition that one should set the surface temperature of a mold for use in the IMC method, in view of the molding formation cycle and the molding capability, at a value which is lower than the curing temperature of a commonly used coating material.

However, in the case of the coating layer formed under the conditions incapable of satisfying the predetermined requirements for curing, there is a possibility that it is difficult to obtain some desired physical properties. Further, coating materials capable of using are often limited. For these reasons, in view of handling coating materials and physical properties of a coating layer, it is preferred that a coating material for use in an IMC method should have a high curing temperature. However, there is such a situation that it is unavoidable to sacrifice the desired physical properties of a coating layer if a high productivity is considered to be important; and, on the other hand, it is unavoidable to sacrifice the high productivity in order to form a coating layer having sufficient physical properties, in the case of the conventional IMC method for a thermoplastic resin material.

That is, fifthly, it is the present situation that there is a strong desire to provide an IMC method for the thermoplastic resin material which is capable of improving the physical properties of coating layer obtainable with shortening in the mold formation cycle so as to improve the productivity, as a consequence of setting a mold temperature at a value which is lower than a curing temperature of a thermosetting coating material, and being capable of curing the coating material at a predetermined temperature and within a predetermined time period.

DISCLOSURE OF INVENTION

The present inventors, after their hard and diligent researches for solving the above-described problems, have found that the following method and apparatus can be used to achieve their purposes. Firstly, there is provided an in-mold coating formation method, wherein the mold is opened at a predetermined interval after a thermoplastic resin material is subjected to molding within a mold, a predetermined amount of a coating material is injected into a space formed between the surface of the thermoplastic resin molded product and the internal surface of the mold cavity of the mold by using a coating material injection device, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that: (1) injection of a coating material is performed only after a time period has passed which is necessary for the surface of the thermoplastic resin molded product to be cured to such an extent that said surface can withstand an injection pressure of the coating material and a flowing pressure of the same;

(2) an injection time of the coating material is set to be within a range of $0.10 \, t_1$ to $0.99 \, t_1$ when a gel time of the coating material at the temperature of the mold is defined as $t_1$;

(3) a time period from the beginning of injection of the coating material to its spreading through the interior of the mold by reclosure of the mold is set to be within a rang of $0.20 \, t_1$ to $1.10 \, t_1$ wherein $t_1$ is the same meaning as defined in the above.

Secondly, there is provided another in-mold coating formation method wherein the mold is opened to form a predetermined interval after a thermoplastic resin material is subjected to molding within a mold, a predetermined amount of a coating material is injected into a space formed between the surface of the thermoplastic resin molded product and the internal surface of the mold cavity of the mold by using a coating material injection device, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that: a stroke of a hydraulic cylinder for providing a driving force to close a mold in a toggle type injection molding machine, or a stroke of a ball screw for providing a driving force to close a mold in a toggle type electric injection molding machine, is subjected to a feedback control which is performed by using a mold closing servo valve or a servo motor, thereby effecting a drive control using a preset mold opening amount changing pattern and a preset mold closing force changing pattern.

In the in-mold coating formation method according to the above second aspect of the present invention, it is preferred that an in-mold pressure of the coating material injected in the mold be subjected to a feedback control using a mold closing servo valve or a servo motor, thereby effecting a drive control using a preset changing pattern. It is also preferred that various command signals representing a start of the measurement of the coating material injection device, a start of the mold opening of an injection molding machine, a start of the injection of the coating material injection device, and a start of the mold reclosing movement of the injection molding machine, be sent and received so as to effect an interlock between the injection molding machine and the coating material injection device. Further, it is preferred that an in-mold pressure of the coating material injected in the mold is increased soon after the completion of the coating material, and is then changed through many steps with the passing of time so that the pressure is gradually reduced, thereby controlling the thickness of the coating layer and the curing condition of the coating material.

Further, according to the second aspect of the present invention there is provided an in-mold coating formation apparatus, wherein after a thermoplastic resin molded product has been formed within a mold, the mold is opened to form a predetermined interval, a predetermined amount of a coating material is injected into a space formed between the surface of the thermoplastic resin molded product and the internal surface of the mold cavity of the mold by using a coating material injection device, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that the apparatus comprises:

a mold closing servo valve for controlling a flow rate and a pressure of a working oil being supplied to a mold closing hydraulic cylinder in a toggle type injection molding machine; a stroke sensor for detecting the stroke of the hydraulic cylinder; a mold opening amount sensor for detecting the mold opening amount of the mold; a mold closing force sensor for detecting a mold closing force of the mold; a coating material pressure sensor for detecting an in-mold pressure of the coating material injected in the mold; a coating material injection device for injecting the coating material; a mold closing condition setting section for setting and inputting the mold's mold opening amount changing pattern and its mold closing force changing pattern, and the coating material's in-mold pressure changing pattern; injection device control section for receiving a command signal fed from the mold closing condition setting section so as to drive and control the coating material injection device; a changing pattern storing section capable of storing a correlation between a stroke of the hydraulic cylinder detected by the stroke sensor and a mold opening amount detected by the mold opening amount sensor, and another correlation between a stroke of the hydraulic cylinder detected by the stroke sensor and a mold closing force detected by the mold closing force sensor, also capable of converting a mold opening amount changing pattern and a mold closing force changing pattern (both of which have been set in advance in the mold closing condition setting section) into stroke changing patterns of respective hydraulic cylinders; a mold closing control section which is provided to cause the mold closing servo valve to perform a feedback control in accordance with a stroke changing pattern of the hydraulic cylinder and an in-mold pressure changing pattern of the coating material.

In fact, the in-mold coating formation apparatus is so formed that the toggle type injection molding machine may be replaced by a toggle type electric injection molding machine, the mold closing hydraulic cylinder may be replaced by a mold closing ball screw, the mold closing servo valve may be replaced by a servo motor.

Thirdly, according to the present invention, there are provided an in-mold coating formation mold and an IMC method using the mold. The in-mold coating formation mold is equipped with a coating material injection device that is provided for injecting a coating material into the mold cavity in order that a coating layer can be formed on the surface of a thermoplastic resin molded product formed by virtue of the mold, and which is also equipped with an auxiliary cavity communicated with the mold cavity of the mold through the entire circumference thereof.

As a mold which can be used in an example according to a third aspect of the present invention, it is allowed to use a shear edge type mold having a shear edge portion, and an auxiliary cavity formed in the shear edge portion. It is also allowed to use another type of mold having such a parting structure that it includes parting surfaces connected with one end of the auxiliary cavity as viewed in its longitudinal direction.

Namely, as the above described molds, it is allowed to use such an in-mold coating formation mold which is equipped with a coating material injection device for injecting a coating material into a mold cavity in order that a coating layer can be formed on the surface of a thermoplastic resin molded product within the mold, characterized in that:

an auxiliary cavity extending in the opening and closing direction of the mold is formed which is communicated with the mold cavity of the mold through the entire circumference thereof, the auxiliary cavity has a thickness of 0.1 to 2 mm and a length of 0.5 to 30 mm. In addition, it is preferred that a heater be provided for heating a cavity surface of the auxiliary cavity, said cavity surface being on the coating material injection side.

Moreover, according to the third aspect of the present invention there is provided a further in-mold coating formation method, wherein an in-mold coating formation mold is used which is equipped with a coating material injection device that is provided for injecting a coating material into the mold cavity in order that a coating layer can be formed on the surface of a thermoplastic resin molded product formed by virtue of the mold, and which is also equipped with an auxiliary cavity communicated with the mold cavity of the mold through the entire circumference thereof, characterized in that: an auxiliary molded body is formed by a resin to be used for molding injected into the auxiliary cavity, a small gap is formed because of a small shrinkage of the auxiliary molded body so that the small gap is located between the auxiliary molded body and the internal surface of the auxiliary cavity, said gap being used in preventing the coating material from flowing out of the mold.

Here, it is preferred that the temperature of the cavity surface on the coating material injection side of the auxiliary cavity is kept higher than other parts of the mold, the coating material spread from the mold cavity surface is cured in the auxiliary cavity, thereby preventing the coating material from flowing out of the mold. Further, it is preferred to use a higher mold closing force than a mold closing force for use in the case not involving an auxiliary cavity, and to fill the auxiliary cavity with a resin under a filling pressure which is higher than usual.

Fourthly, according to the present invention there is provided an in-mold coating formation method, wherein after a thermoplastic resin molded product has been formed within a mold, the mold is opened to form a predetermined interval, a predetermined amount of a coating material is injected into a space formed between the surface of the thermoplastic resin molded product and the internal surface of the mold cavity of the mold by using a coating material injection device, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that: after a thermoplastic resin molded product has been formed, the mold is opened to form a predetermined interval, a predetermined amount of a coating material is injected into a space formed between the surface of the thermoplastic resin molded product and the internal surface of the mold cavity of the mold by using a coating material injection device, the mold is then closed upon the completion of injection of the coating material; an in-mold pressure of the coating material is controlled such that said pressure will arrive at a predetermined value which is 5 MPa or higher in a zone where the in-mold pressure of the coating material applied to the thermoplastic resin molded product becomes lowest. Preferably, the above control is performed in a manner such that the in-mold pressure will be in a range of 5 MPa to 15 MPa, while at the same time the coating material is caused to flow over the entire surface of the thermoplastic resin molded product so as to tightly cover the same. After that, the in-mold pressure of the coating material is controlled such that said pressure will arrive at a predetermined value which is 0.5 MPa or higher, preferably 0.5 MPa to 2.0 MPa, in a zone where the thermoplastic resin molded product receives the lowest pressure within the mold.

In the in-mold coating formation method according to a fourth aspect of the present invention, a sub-cavity is formed which is communicated with the mold cavity, a groove portion is formed which is communicated with the sub-cavity. Further, according to the in-mold coating formation method of the present invention, it is preferred to use a toggle type injection molding machine or a toggle type electric injection molding machine.

Fifthly, according to a fifth aspect of the present invention, there is provided a still further in-mold coating formation method, wherein after a thermoplastic resin molded product has been formed within a mold, the mold is opened to form a predetermined interval therebetween, a coating material injection device is then used to inject a predetermined amount of coating material into a space formed between the surface of the thermoplastic resin molded product and the internal surface of the mold cavity of the mold, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that a coating material is injected under a condition where the surface temperature of the thermoplastic resin molded product is higher than the curing temperature of the coating material, and the temperature of the mold on the mold cavity side is lower than the curing temperature of the coating material.

Further, according to this aspect of the present invention there is provided a still further in-mold coating formation method, wherein after a thermoplastic resin molded product has been formed within a mold, the mold is opened to form a predetermined interval therebetween, a coating material injection device is then used to inject a predetermined amount of coating material into a space formed between the surface of the thermoplastic resin molded product and the internal surface of the mold cavity of the mold, the mold is reclosed upon the completion of injection of the coating material, the injected coating material is allowed to cure within the mold so as to obtain an integrally formed molded product having a coating layer tightly adhered to the surface of the thermoplastic resin molded product, characterized in that: when the surface of the thermoplastic resin molded product has been cured, the mold is opened at a predetermined interval, a heat diffusion from the surface of the thermoplastic resin molded product to the mold is prohibited, after the surface temperature of the thermoplastic resin molded product has been increased to a value which is equal to or higher than the curing temperature of the coating material because of an amount of heat held within the thermoplastic resin molded product, the coating material is injected.

When carrying out the in-mold coating formation method according to the fifth aspect of the present invention, it is preferred to use an injection molding machine having an excellent mold driving capability and an excellent positioning capability, and it is also preferred to use either a toggle type injection molding machine or a toggle type electric injection molding machine.

BEST MODEL FOR CARRYING OUT THE INVENTION

Figure 1:
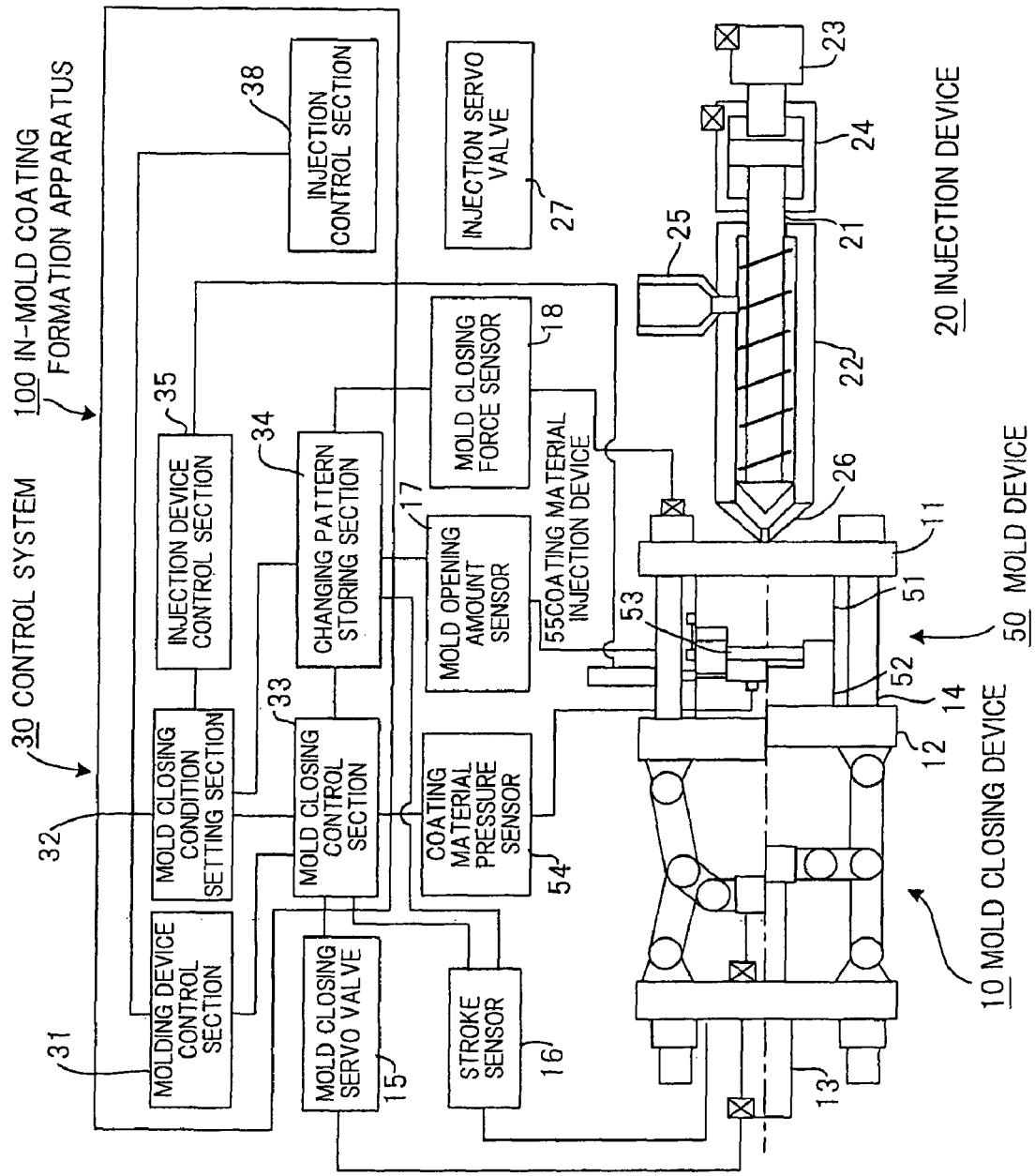
FIG. 1 is an explanatory view schematically indicating an example representing an in-mold coating formation apparatus that can be suitably used in one example of the present invention.
Figure 2:
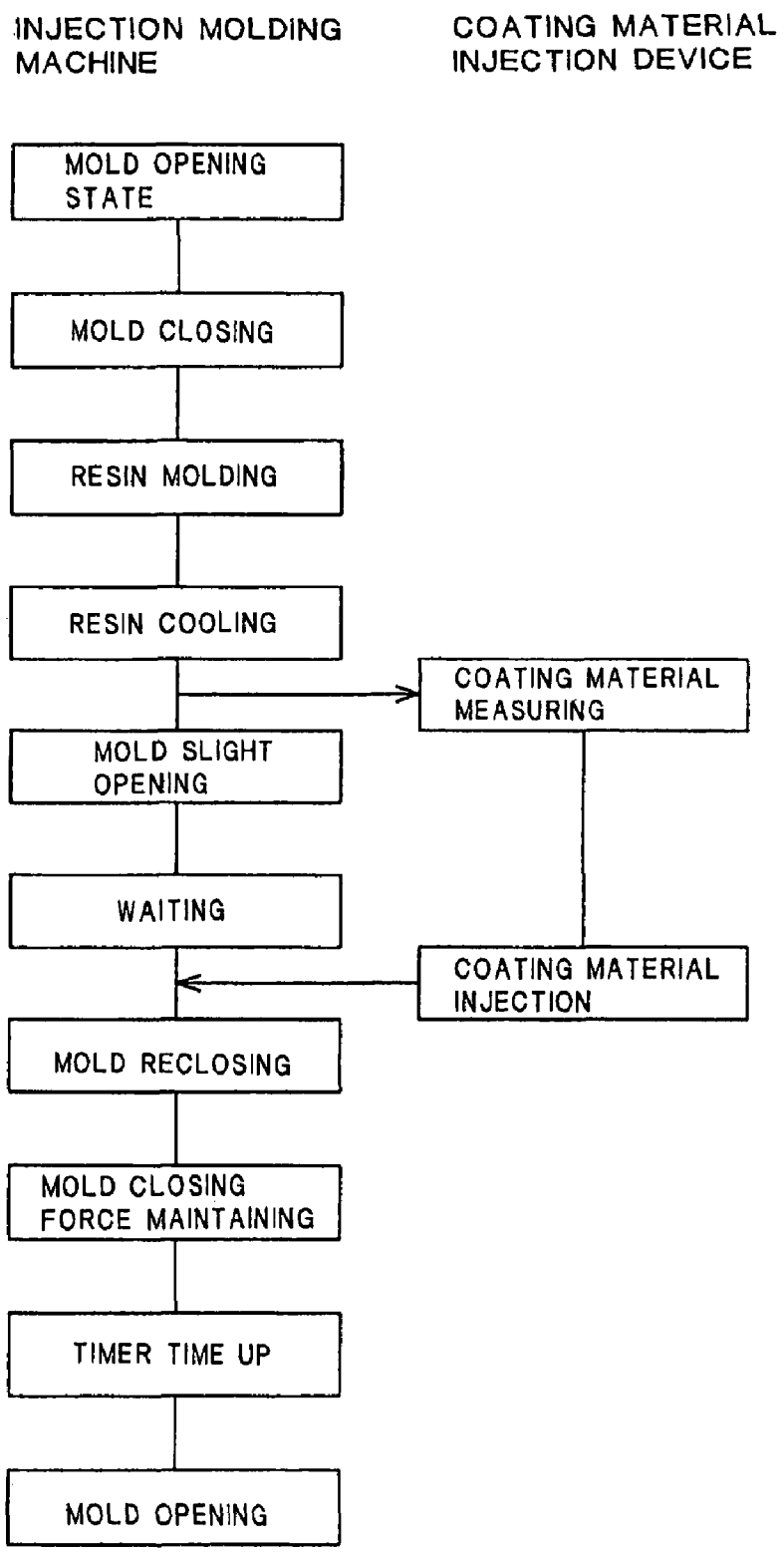
FIG. 2 is a flow chart indicating a molding processes according to example 1 and example 2, both of which can be carried out with the use of the in-mold coating formation apparatus shown in FIG. 1.

In the following, first to fifth aspects of the present invention will be described in detail with reference to the accompanying drawings. However, in the following drawings, members and elements that provide the same functions will in principle be represented by the same reference numerals.

An embodiment according to the first aspect of the present invention directed to a method which comprises coating the surface of the thermoplastic resin molded product with a coating material so as to form coating layer having a uniform appearance and quality by setting properly the period for injecting the coating material and the time required for the completion of the reclosing step in accordance with the gel time of the coating material, at the time when the mold is opened at predetermined interval after a thermoplastic resin material is subjected to molding within a mold, a coating material is injected into the thus opened mold, the mold is closed again after the completion of the injection of the coating material, the coating material is uniformly spread within the mold under applying a pressure, and the resultant is caused to cure.

(Time for Starting the Injection of a Coating Material)

In a method for forming a coating layer on the surface of a molded resin product within a mold, a time for starting the injection of a coating material may be properly selected in view of the sort of a thermoplastic resin material and a molding condition. However, the coating material injection should be started at the time when the surface of the molded resin product has been cured to such an extent that it can withstand a injection pressure and a flowing pressure of a coating material. Here, the time when the surface of the molded resin product has been cured to such an extent that it can withstand a injection pressure and a flowing pressure of a coating material, is meant to represent such a time at which the temperature of the resin is equal to or lower than its heat distortion temperature if it is an amorphous resin, or the temperature of the resin is equal to or lower than its crystallizing temperature if it is a crystalline resin, with a precondition that the molded product is formed by a thermoplastic resin. Further, during a process of molding a resin product, the surface temperature of a molded product will inherently become a function of a time. Accordingly, it is preferred that a time period necessary for the resin to reach a temperature which is equal to or lower than the heat distortion temperature or the crystallizing temperature should be confirmed at each cycle for forming each molded product, thereby facilitating a control which can determine a time for starting the injection of the coating material. For example, as shown in the following Examples 1 and 2, a coating material can be injected at the time when the resin has been cooled for 20 seconds after it is molded.

(Coating Material Injection Time)

In the following, description will be given mainly for explaining a coating material injection time in accordance with the first aspect of the present invention. However, if necessary, it is of course that such a coating material injection time may also be used in the other aspects of the invention. According to the first aspect of the invention, if $t_1$ is used to represent a gel time of a coating material when it is at the temperature of the internal surface of a mold cavity, a time necessary for injecting a coating material into a space formed between the internal surface of the mold and the surface of thus obtained molded product should be within a range of $0.10 \, t_1$ to $0.99 \, \mu l$, preferably within a range of $0.2 \, t_1$ to $0.8 \, \mu l$. If the coating material injection time is short than the above range, the pigment separation and the weld lines will become quite remarkable, thus it is not preferable. On the other hand, if the coating material injection time is longer than the above range, during a process in which the curing reaction of the coating material is proceeding, it is difficult for the coating material to cover the entire molded product including its end portions, causing wrinkles and cracks to easily occur in the cured coating layer. For this reason, a coating material injection time longer than the above range is not preferable.

Here, "$t_1$" is used to represent the gel time of a coating material when the coating material is exposed to an internal surface temperature of the mold, in which the surface of the molded product is just being coated by the coating material. In fact, the gel time may be measured with the use of an ICAM-1000 Dielectro Meter (Manufactured by Micromet Instrument Inc.)

(Mold Reclosure Completion Time)

In the present specification, the mold reclosure completion time is meant to represent a necessary time period starting from a time when the coating material is begun to be injected into a mold, including a time period for the mold to be reclosed, also including an operation time necessary for the injected coating material to spread all over the internal space of the mold cavity (hereinafter simply referred to as mold reclosure completion time). According to the first aspect of the present invention, a time period from the starting of injection of a coating material into the mold cavity until the completion of the reclosing of the mold is required to be set within a range of $0.20 \, t_1$ to $1.10 \, t_1$ wherein $t_1$ is the same meaning as defined above, preferably within a range of $0.50 \, t_1$ to $1.00 \, t_1$. If a mold reclosure completion time is shorter than the above range, a pigment contained in the coating material is likely to be separated therefrom. Moreover, if a pigment contained in the coating material is a flake-like material such as an aluminum flake pigment, weld lines will occur remarkably. Accordingly, a mold reclosure completion time shorter than the above range is not preferable if it is desired to obtain a high quality for the outside appearance of a molded product. On the other hand, if the mold reclosure completion time is longer than the above range, during a process in which the curing reaction of the coating material is proceeding, it is difficult for the coating material to cover the entire molded product including its end portions, causing wrinkles and cracks to easily occur in the cured coating layer. For this reason, a mold reclosure completion time longer than the above range is not preferable, either. Nevertheless, a time period starting from the completion of coating material injection until the beginning of reclosing the mold should be within an appropriate range of $0.00 \, t_1$ to $0.50 \, t_1$. Of course, according to other aspects of the invention, it is preferred that the mold reclosure completion time be controlled with the above range.

(Usable Synthetic Resins for the Substrate)

According to the first to fifth aspects of the present invention, molding materials capable of using in the present invention may be listed as follows. Namely, they may be thermoplastic resin materials such as polyethylene, polypropylene, acrylonitrile-butadiene-styrene copolymer, polycarbonate, polyamide, polyethylene terephthalate, polybuthylene terephthalate, a modified polyphenylene ether and the like, which can be used singly or in a mixed form, and can also be mixed into a fiber-like filler or a flake-like filler.

(Usable Coating Materials)

Further, the coating materials capable of using according to the first to fifth aspects of the present invention may be various known coating materials suitable for use in an in-mold coating formation method. For instance, it is allowed to use the coating materials disclosed in JP-A-54-36369, JP-A-54-139962, JP-A-55-65511, JP-A-57-140, JP-A-60-212467, JP-A-60-221437, JP-A-1-229605, JP-A-5-70712, JP-A-5-148375, JP-A-6-107750, JP-A-8-113761.

Particularly, it is allowed to use a coating material comprising a vehicle component, a pigment and polymerization initiator. Here, the vehicle component includes 20 to 70 wt % of an oligomer or its resin, such as an urethane acrylate oligomer and an epoxy acrylate oligomer each having at least two (metha) acrylate groups, or an unsaturated polyester resin, and 80 to 30 wt % of a copolymerizable ethylenically unsaturated monomer such as methyl (metha)acrylate, ethyl (metha)acrylate, propyl (metha)-acrylate, butyl (metha)acrylate, 2-ethylhexyl (metha)acrylate, (metha)acrylic acid, vinyl acetate, tripropylene glycol diacrylate, styrene or the like. Further, it is also possible to use a two-compartment type coating material such as epoxy resin/polyamine curable type one, polyol resin/polyisocyante curable type one, each including a main agent and a curing agent which are mixed together just before being injected into the mold.

The mold temperature condition suitable for carrying out the in-mold coating formation method of the present invention, should be selected properly by taking into account a time for curing the surface of a molded product and a time for curing a coating material, in view of the sort of a molding material and the sort of a coating material, also in view of an actually formed molded product.

(Temperature Condition for Molding)

As related in the above, an indispensable condition for injecting a coating material is that the surface of a molded product has been cured to such an extent that it can withstand an injection pressure of a coating material, and its flowing resistance. However, if the temperature of a mold at this time is too high, it will need a longer time necessary for the surface of the molded product to complete its solidification, causing a problem that the molding cycle will be undesirably extended. On the other hand, if the temperature of a mold at this time is too low, there will be another problem that the coating material curing time will become quite long, or the solidification of the coating material is not completed. A mold temperature providing a good balance between a curing time of the surface of a molded product and a coating material curing time should be in a temperature range corresponding to the specific nature of each resin molding material. However, various mold temperatures corresponding to various resin molding materials are shown in the following Table 1 and it is preferred that the temperature of a mold be selected from the temperature ranges listed below. Nevertheless, it is of course that the following mold temperature ranges may be used in any of the first to fifth aspects of the present invention.

TABLE 1

| Material to be used for molding | Temperature range for molding |
| --- | --- |
| Polyethylene resin | 60-80° C. |
| Polypropylene resin | 80-110° C. |
| Acrylonitrile-Butadiene-Styrene copolymer resin | 80-100° C. |
| Polycarbonate resin | 110-140° C. |
| Polyamide resin | 110-140° C. |
| Polyethylene terephthalate resin | 100-130° C. |
| Polybutylene terephthalate resin | 100-130° C. |
| Modified polyphenylene ether resin | 100-130° C. |

(In-Mold Coating Formation Apparatus)

FIG. 1 is an explanatory view schematically indicating an entire structure of an in-mold coating formation apparatus (hereinafter referred to as IMC apparatus) formed according to the present invention. It is of course that the apparatus shown in the drawing is suitable for use in any one of the first to fifth aspects of the present invention. In detail, the IMC apparatus 100 is formed by making use of a toggle type injection molding machine, including a mold closing device 10, an injection device 20, a control device 30 and a mold device 50.

The mold closing device 10 is comprised of a stationary platen 11 and a moving platen 12, both of which are provided for installing the mold device 50. The moving platen 12 is guided by a tie rod 14 and can be made to move back and forth by virtue of a hydraulic cylinder 13 provided for driving the mold to close it (hereinafter, referred to as mold closing cylinder). In this way, when the moving platen 12 is moved back and forth relative to the stationary platen 11, the mold device 50 can be opened or closed.

However, the toggle type injection molding machine can operate in accordance with a relationship between the stroke amount of the mold closing cylinder 13 and the moving amount of the moving platen 12. This relationship will continuously change with the changes in the angles of toggle links. In the area just before the toggle links become straight lines, the moving amount of the moving platen 12 will become small with respect to the stroke amount of the mold closing cylinder 13, while at the same time the mold closing cylinder 13 is driven continuously by virtue of a relatively low oil pressure, thereby producing a large mold closing force.

Therefore, if compared with a direct press type injection mold machine capable of directly driving a mold by virtue of a hydraulic cylinder, the toggle type injection molding machine is characterized in that it can provide a desired driving action by virtue of the mold closing cylinder 13 having an excellent driving property and particularly an excellent high speed driving property, and that it can control the position of the mold device 50 with an extremely high efficiency by virtue of a force doubling mechanism of the mold closing device 10. Further, the toggle type injection molding machine is characterized in that it can produce a sufficiently strong mold closing force. In addition, with the use of its excellent driving property, as will be described later in the present specification, the IMC method (in-mold coating formation method) may be used so that a coating material may be injected into the mold cavity, the injected coating material is then caused to spread uniformly all over the internal surface of the mold cavity, thereby making it possible for the coating material to be cured uniformly, thus obtaining a desired coating layer formed on the surface of a molded product.

The injection device 20 comprises a screw member 21 having a spiral flat portion and a barrel 22 enclosing the screw 21, in a manner such that the screw member 21 may be driven by a hydraulic motor 23 so as to move freely back and forth along the internal surface of the barrel 22. In this way, with the rotation of the screw member 21, an amount of resin pellets supplied to a hopper 25 will be sent toward the screw member 21. Meanwhile, the resin pellets are heated by virtue of a heater (not shown) attached on the outer surface of the barrel 22, so that the resin pellets may be melted within the barrel through a kneading action by virtue of the rotation of the screw member 21.

Once an amount of a molten resin being sent forward along the screw member 21 arrives at a predetermined value, the driving operation of the hydraulic motor 23 is stopped, and at the same time an injection cylinder 24 is driven so that the screw member 21 is caused to move forwardly. As a result, the molten resin material accumulated in the front area of the screw member 21 will be injected through a nozzle 26 into a mold cavity 53 of the mold device 50.

The mold device 50 comprises a fixed mold portion 51 attached on the stationary platen 11 and a movable mold portion 52 attached on the moving platen 12. The movable mold portion 52 includes a coating material injection device 55 for injecting a coating material into the mold cavity 53, and a coating material pressure sensor 54 for detecting the coating material injected in the mold cavity 53. However, for use as the mold device 50, it is preferred to use a mold according to the second aspect of the invention or a mold according to the third aspect of the invention.

Next, the structure of the control device 30 will be described. As shown in FIG. 1, the control device 30 has a molding device control section 31 and an injection control section 38. The molding device control section 31 can effect an interlocking between the mold closing device 10 and the injection device 20 and can totally control an entire system of the control section 30. The injection control section 38 can control the operation of the injection device 20. The two control sections 31 and 38 have controlling functions similar to a control section of a common injection molding machine.

On the other hand, a control section having the control function inherent in the IMC apparatus 100 of the present invention has an injection machine control section 35 and a changing pattern storing section 34. The injection machine control section 35 is provided to receive a molding condition data signal (which means a changing pattern of a molding condition and will have the same meaning in the following) from a mold closing condition setting section 32 so as to control the operation of the mold closing device 10. The changing pattern storing section 34 is provided to receive from the mold closing condition setting section 32 some molding condition data signals such as a mold opening amount of the mold portions 51, 52 (hereinafter referred to as "mold opening amount") and a mold closing force of the mold portions 51, 52 (hereinafter referred to as "mold closing force"), and to convert these data signals into the molding condition data signals of the stroke of the mold closing cylinder 13 and to send these signals to the mold closing control section 33.

Here, the mold closing condition setting section 32 is provided to set various molding conditions such as an opening/closing speed of the mold closing device 10, its operation timing, its mold opening amount, its mold closing force, and an injecting amount of the coating material injection device 55, its injection speed, its injection timing, its injection pressure, and a pressure of the coating material within the mold cavity 53. In this way, the molding condition data signals relating to an injecting amount of the coating material injection device 55, its injection speed, its injection timing and its injection pressure are sent from the mold closing condition setting section 32 to an injection machine control section 35. On the other hand, the molding condition data signals relating to an opening/closing speed of the mold closing device 10, its operation timing and a pressure of the coating material within the mold cavity 53 are sent from the same mold closing condition setting section to a mold closing control section 33. Further, as to the molding conditions relating to a mold opening amount and a mold closing force, their molding condition data signals are sent to the above changing pattern storing section 34.

Nevertheless, the changing pattern storing section 34 is required to store in advance two kinds of correlations before it is put into its controlling operation. One correlation is a relationship between a mold opening amount and a stroke of the mold closing cylinder 13, while the other correlation is a relationship between a mold closing force and a stroke of the mold closing cylinder 13.

For this reason, after the mold device 50 has been attached on to the stationary platen 11 and the moving platen 12, it is necessary to use the same procedure as in a common injection molding machine to perform a correlation calculation under a condition where a die height adjustment and a mold closing force adjustment have been completed in accordance with mold thickness (die height) of the mold device 50. In detail, the correlation calculation is performed under a condition where the mold device 50 is being opened and closed for the purpose of adjustment and the calculation itself is conducted in the changing pattern storing section 34 which can continuously receive several detection signals fed from a stroke sensor 16, a mold opening amount sensor 17, a mold closing force sensor 18, thereby obtaining and storing a correlation between a mold opening amount and a stroke of the mold closing cylinder 13, and another correlation between a mold closing force and a stroke of the mold closing cylinder 13.

In the following, some detailed examples will be given to explain an operation of the IMC apparatus 100 for carrying out the IMC method which uses the IMC apparatus 100 having the control device 30 constructed in the above described manner.

At first, a feedback control is conducted by virtue of a control signal fed from the mold closing control section 33 and also by virtue of a mold closing servo valve 15, while at the same time the movable mold portion 52, driven by the mold closing cylinder 13 and in accordance with a mold closing speed pattern set in the mold closing condition setting section 32, is moved forward from its opening limit position so that movable mold portion 52 can get in contact with the fixed mold portion 51. After that, the feedback control is performed by virtue of a control signal fed from the mold closing control section 33 and a mold closing servo valve 15, while at the same time the movable mold portion 52, driven by the mold closing cylinder 13 and in accordance with a molding condition data signal of a mold closing force (a changing pattern of a mold closing force) set in the mold closing condition setting section 32, is moved forward still further. In this way, a tie rod 14 is extended so that a predetermined mold closing force is exerted on the mold device 50.

A molten resin stored in the front portion of the screw 21 is injected through a nozzle 26 into the mold cavity 53 when the screw 21 is caused to proceed forwardly by the injection cylinder 24, while controlling an opening degree of an injection servo valve 27 according to the control signal fed from the injection control section 38 in predetermined timing during the operation of the mold closing device 10 mentioned above, thereby forming a thermoplastic resin molded product. On the other hand, in order to achieve an interlock effect between the operation of the closing device 10 and the operation of the injection device, the operation timing signals of the two devices can be transmitted between these two devices by the molding control section 31.

Subsequently, the movable mold portion 52 is caused to move back by virtue of the mold closing cylinder 13. Then, a feedback control is conducted by virtue of a control signal fed from the mold closing control section 33 and also by virtue of a mold closing servo valve 15, while at the same time providing a predetermined mold opening amount set in the mold closing condition setting section 32, thereby forming a gap between the surface of the thermoplastic resin molded product and the internal surface of the mold cavity. After that, in accordance with an injecting amount of the coating material injection device 55, its injection speed, its injection timing, its injection pressure which are all set in the mold closing condition setting section 32, the coating material injection device 55 will be driven by a control signal fed from the injection machine control section 35, so as to inject the coating material into the mold cavity 53.

Afterwards, a feedback control is conducted by virtue of a control signal fed from the mold closing control section 33 and also by virtue of a mold closing servo valve 15, while at the same time the movable mold portion 52 is again caused to move forward by virtue of the mold closing cylinder 13, thereby effecting an operation in accordance with a data signal of a mold reclosing condition (a mold opening amount changing pattern) and an operation in accordance with a data signal of a molding condition of a coating material (a pressure pattern of the coating material), which data signals are all set in advance in the mold closing condition setting section 32. In this way, the injected coating material is caused to spread over the entire surface of the thermoplastic resin molded product, thereby providing an optimum molding condition for the appearance and the adhesion strength of the coating layer.

On other hand, in order for the coating layer to stabilize its outside appearance and its adhesion strength, it is preferred to use the coating material pressure sensor 54 to perform a feedback control in accordance with a predetermined coating material pressure pattern. In particular, as shown in Example 3 which will be described later in the present specification, if an internal pressure within a mold containing an injected coating material is at first increased immediately after the injection of the coating material, and then is gradually reduced to make the internal pressure to change gradually step by step, the injected coating material will be allowed to spread more uniformly within the mold, making it possible to use a coating material having a high viscosity.

However, if it is difficult to dispose the coating material pressure sensor 54 in the mold device 50, a mold closing force pattern may be set to replace the above coating material pressure pattern, thereby effecting a feed back control in accordance with the mold closing force pattern.

Subsequently, a feedback control is conducted again by virtue of a control signal fed from the mold closing control section 33 and also by virtue of a mold closing servo valve 15, while at the same time the movable mold portion 52 is caused to operate in accordance with an operation timing and a mold opening speed pattern set in advance in the mold closing condition setting section 32, so that the movable mold is moved back to its opening limit position, and an integrally formed molded product is taken out from the mold device 50. In this way, one cycle of molding process is thus completed.

As described in the above, with the use of the present invention, the mold closing speed pattern, the mold closing force pattern, the mold opening amount pattern and the mold opening speed pattern, all set in advance in the mold closing condition setting section 32, can all be unified into a stroke pattern of the mold closing cylinder so as to be subjected to the feedback control. Consequently, even under a molding condition where the mold closing force and the mold opening amount are alternatively repeated, a control object will still be the stroke pattern of the mold closing cylinder.

For this reason, since it is allowed to ensure a continuous control without involving the change of the control object, it is possible to obtain a high response capable of dealing with a rapidly changing pattern. Namely, since the above described simplified control system can be used in the toggle type injection molding machine which inherently has a high response and a high precision, these desired characteristics are allowed to exhibit to their maximum extents. In this way, a process beginning with the injection of a coating material into the mold and ending with the solidification of the coating material, will be kept at a high response, and may be driven and controlled with a high precision, thereby making it sure to stabilize the state of a formed coating layer, increase the yield of the molded products, shorten the manufacturing cycle and improve the productivity.

Next, detailed description will be made to explain an embodiment according to the second aspect of the present invention. However, the present invention is by no means to be limited to such an embodiment.

Similar to the manner described in the above, in this embodiment of the present invention, the mold closing speed pattern, the mold closing force pattern, the mold opening amount pattern and the mold opening speed pattern, all set in advance in the mold closing condition setting section 32 of the in-mold coating formation apparatus shown in FIG. 1, can all be unified into a stroke pattern of the mold closing cylinder so as to be subjected to a feedback control. Consequently, even under a molding condition where the mold closing force and the mold opening amount are alternatively repeated, a control object will still be the stroke pattern of the mold closing cylinder.

For this reason, since it is allowed to ensure a continuous control without involving the change of the control object, it is possible to obtain a high response capable of dealing with a rapidly changing pattern. Namely, since the above described simplified control system can be used in the toggle type injection molding machine which inherently has a high response and a high precision, these desired characteristics are allowed to exhibit to their maximum extents. In this way, a process beginning with the injection of a coating material into the mold and ending with curing time of the coating material, will be kept at a high response, and may be driven and controlled with a high precision, thereby making it sure to stabilize the state of a formed coating layer, increase the yield of the molded products, shorten the manufacturing cycle and improve the productivity.

Nevertheless, when using the IMC methods and the IMC apparatus of the present invention, the mold portions 51, 52 are preferred to be shear edge type ones. Of course, it is also possible to use flat parting type molds if they are required to be so used in view of the shape of an object product.

However, although a thermoplastic resin injection molding process often uses flat parting type molds, at this time a part of a mold closing force generated in an injection molding machine will be converted into a compressive force compressing the thermoplastic resin molded product and the coating material. In fact, such a part of the mold closing force is received on the parting surfaces of the mold. Further, the mold closing force will change with the lapse of time, depending upon a volume change caused due to a temperature change of the molded resin product and the coating material in the mold and also due to a curing shrinkage of these materials. For this reason, when using a flat parting type mold, merely the control of the mold closing force is not sufficient for controlling the compressing force which compresses the thermoplastic resin molded product and the coating material.

On the other hand, if a coating material pressure sensor is attached in a mold and if the feedback control is performed in accordance with a predetermined coating material pressure pattern, even under a condition where the state of a coating layer within the mold will be different from one coating material injection to another, it is still possible to effect a desired control of a molding condition, so that it is sure for a formed coating layer to obtain a stabilized outside appearance and a stabilized adhesion strength.

On the other hand, in a prior art a shear edge type mold is often used to deal with SMC and BMC resins. In such a case, almost all the mold closing forces produced in an injection molding machine will be converted into a compressive force (coating material pressure) which compresses the thermoplastic resin molded product. As a result, it is possible to form a desired coating layer having predetermined characteristics, only through a feedback control of the mold closing force.

Although it has been described in the above that the IMC apparatus 100 can be a toggle type injection molding machine, it is also possible to use a toggle type electric injection molding machine in place of the above mentioned toggle type injection molding machine. In this case, it is allowed to use a mold closing ball screw in place of the mold closing cylinder, and to use a mold closing servo motor in place of the mold closing servo valve. Accordingly, the IMC method and IMC apparatus of the present invention should not be limited to the above specifically described method and apparatus. In fact, it is also possible to perform some different but appropriate operations in accordance with some specific requirements demanded by an actual molding process. However, some different operations of the inventive method will be described in the following examples of the present invention.

Next, description will be given and the accompanying drawings will be referred to explain in detail an in-mold coating formation mold and an in-mold coating formation method (IMC), according to an example of the third aspect of the present invention. However, the present invention is by no means to be limited to the following specific example.

Figure 7:
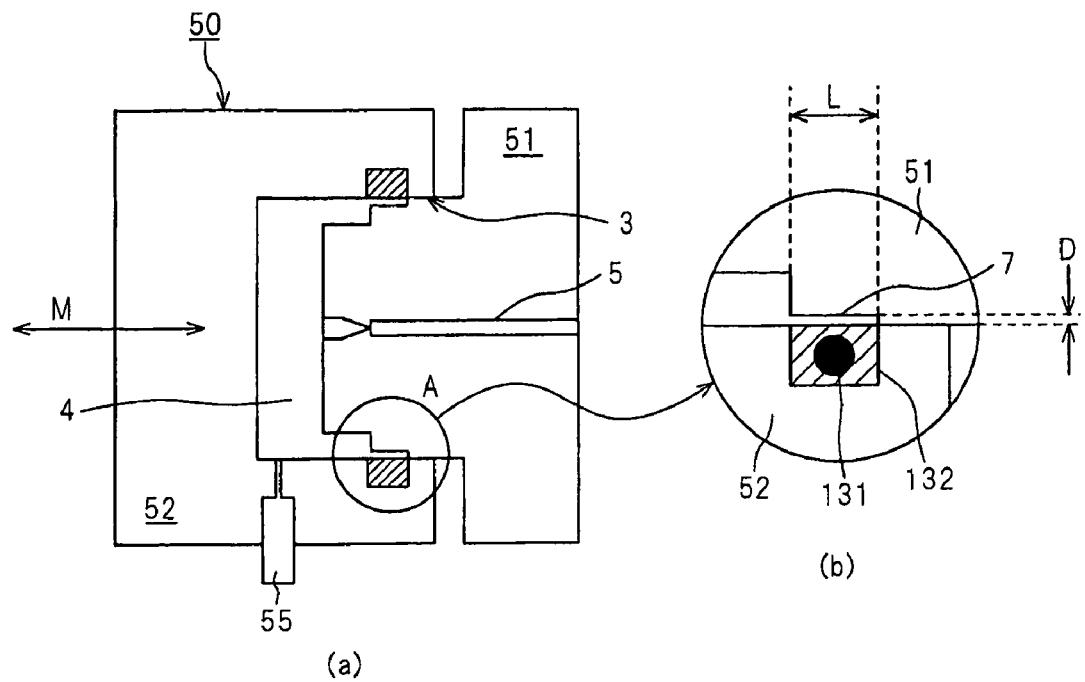
FIG. 7(a) is a sectional view schematically indicating a condition where a mold has been closed, illustrating an in-mold coating formation mold formed according to a third aspect of the invention. (b) is an enlarged view clearly indicating an area represented by A in (a).

FIG. 7(a) (a figure on the left side) is a sectional view schematically indicating one embodiment of an in-mold coating formation mold (hereinafter, referred to as IMC mold) which can be used in the third aspect of the present invention. In fact, the figure is used to show a condition where the mold has just been closed. In detail, the IMC mold 50 comprises a fixed mold portion 51 and a movable mold portion 52, which are engaged with each other through a shear edge portion 3 to form a mold cavity 4. The fixed mold portion 51 is provided with a hot runner 15 which is used to inject a molten resin. On the other hand, the movable mold 52 is provided with a coating material injection device 55 which is used to inject a coating material into the mold cavity 4 in order that a coating layer can be formed on the surface of a thermoplastic resin product molded in the IMC mold 50. In fact, the coating layer formation is completed within the IMC mold 50. Although it is not shown in FIG. 7(a) that there is a moving device for moving the movable mold portion 52, the movable mold portion 52 is in fact opened and closed in a direction shown by an arrow M in FIG. 7.

FIG. 7(b) (a figure on the right side) is an enlarged view showing in detail an area in the vicinity of the shear edge portion 3, with said area being represented by a reference A in FIG. 7(a). As shown in the figure, an auxiliary cavity 7 is formed and it is extending in the opening/closing direction of the movable mold portion 52. Further, the shear edge portion 3 of the fixed mold portion 51 has been processed into such a configuration that the entire internal surface of the mold cavity 4 is communicated with the shear edge portion. In this manner, the molten resin introduced into the auxiliary cavity 7 will be formed into an "auxiliary molded body" integrally formed with the molded product formed within the mold cavity 4.

Figure 9:
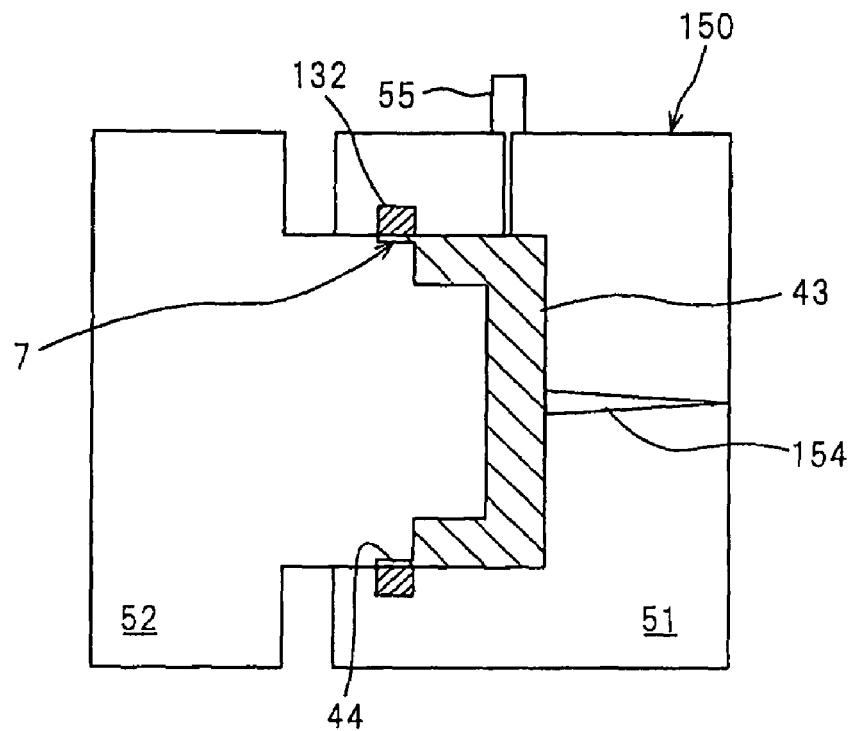
FIG. 9 is a view schematically indicating a still further example of an in-mold coating formation mold formed according to the third aspect of the present invention.

However, the auxiliary cavity 7 can be formed in a manner shown in a mold 150 illustrated in FIG. 9 which schematically indicates a mold used in an example according to the third aspect of the present invention. Namely, the auxiliary cavity is allowed to be formed by taking into account the shape of a molded resin product, the position of a sprue section and the position of a coating material injecting device, and by processing the shear edge portion of the movable mold. In other words, it is not necessary to pay attention as to which mold portion should be designated as a fixed mold portion and which mold portion should be designated as a movable mold portion. Instead, what is necessary to be done is only that when the mold is divided into a male mold and a female mold, the shear edge portion of the male mold is processed to form the auxiliary cavity so as to form an auxiliary molded body. However, if the mold has not been divided into a male mold and a female mold, what is necessary to be done is only to form an auxiliary cavity in a mold whose surface is opposite to the coating layer of the molded product.

Referring to FIG. 7(a), when a coating material has been injected from the coating material injecting device 55, the injected coating material will spread through an internal space formed between the inner surface of the movable mold 52 and a molded main body, so as to arrive at the shear edge portion 3. At this time, some gaps possible for the coating material to leak outwardly through the shear edge portion 3 is allowed to form, by virtue of a shrinkage in a thickness direction (a vertical direction in FIG. 7(a)), in the molded main body formed within the mold cavity 4 and in the auxiliary body formed within the auxiliary cavity 7. In addition, when an injection pressure of the coating material is high, the cured resin will be compressed so as to shrink, thus forming the above mentioned gaps. In any case, a shrinkage of a resin material is proportional in its extent to a thickness of a molded body.

Therefore, in the case where the auxiliary cavity 7 has not been formed, since a molded body will shrink greatly in its thickness direction, a coating material will flow to enlarge the gap formed between the molded body and the inner surface of the movable mold portion 52, hence flowing easily into the shear edge portion 3 and then out of the mold. This is because the shear edge portion 3 has a gap which, under a certain predetermined pressure, will not allow a resin to be used for molding usually having a high viscosity to flow thereto, but will allow the coating material which usually has a low viscosity to flow thereto.

On the other hand, in the case where the auxiliary cavity 7 has been formed and an auxiliary molded body having a small thickness is existing in the cavity, since an absolute value of a shrinking amount in the thickness direction of the auxiliary molded body is small, a gap formed in the above described manner will not be large enough to cause the coating material to leak out of the mold, thereby preventing the leakage of a coating material. Further, as may be clearly understood from the opening/closing direction of the movable mold portion 52, the gap formed due to a shrinkage in the molded main body and the auxiliary molded body will not change in its size even under a condition where the movable mold portion 52 has been opened to some extent in order to inject a coating material. Therefore, with the use of the IMC mold 50 formed according to the third aspect of the present invention, we can easily carry out the injection of a coating material and its solidification even when the movable mold portion 52 has been opened to some extent.

Preferably, the thickness D of the auxiliary cavity 7 is set to be within a range of 0.1 mm to 2 mm, while its length L (extending in the opening/closing direction of the movable mold portion 52) is set to be within a range of 0.5 mm to 30 mm. If the thickness D is too small, it will be difficult to fill the narrow space with a resin and hence it is difficult to form an auxiliary molded body. On the other hand, if the thickness is too large, a gap caused due to the above described shrinkage will be enlarged, thus losing a desired effect of preventing the leakage of a coating material. Now, if the length L is too short, it is difficult to ensure a sufficient effect of preventing the leakage of a coating material. On the other hand, if the length is too long, it will be difficult to completely fill the long space with a resin and will thus cause a waste of the resin.

Figure 8:
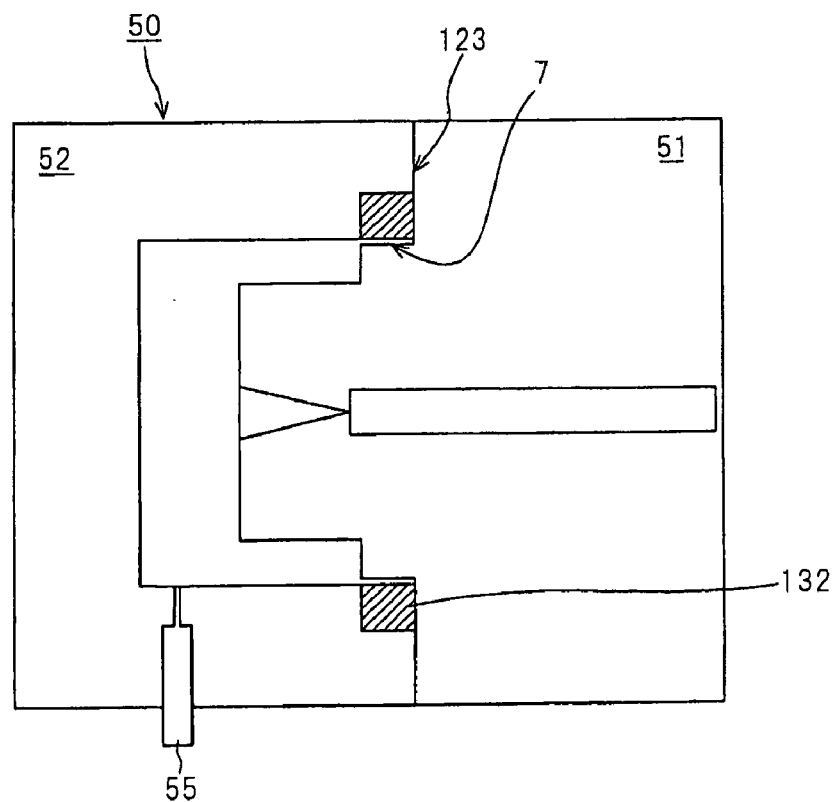
FIG. 8 is a view schematically indicating another example of an in-mold coating formation mold formed according to a third aspect of the present invention.

However, the IMC mold 50 should not be limited to the above described shear edge type. In fact, it is also allowed to use another IMC mold 50 shown in FIG. 8, which comprises a fixed mold portion 51 and a movable mold portion 52, having parting surfaces 123. In detail, one end of an auxiliary cavity 7 is connected with the parting surfaces 123. Such an IMC mold 50 having such a parting structure may be used as a mold in the third aspect of the present invention. FIG. 8 is a view schematically showing a condition where the mold has just been closed. As shown in the figure, the resin injected into the auxiliary cavity 7 having a small thickness has only a small shrinking amount in its thickness direction, so that the coating material can be prevented from flowing out to the parting surfaces 123, thereby ensuring a desired solidification of the coating material within the auxiliary cavity 7.

In addition, with regard to the IMC mold 50, in order to enhance the solidification of the coating material in the auxiliary cavity 7 and to exactly prevent the coating material from flowing out of the mold, it is preferred to perform a treatment shown in FIG. 7(b). Namely, in order to keep at a high temperature an internal surface on the coating material injection side of the auxiliary cavity 7, i.e., a part of the auxiliary cavity's internal surface which is located close to the movable mold portion 52 and receives an injection of the coating material, it is preferred to provide a heater 131 so as to form a heating block 132. At this time, when a thermosetting coating material is caused to flow through a gap formed between the heating block 132 and the auxiliary molded body formed in the auxiliary cavity 7, the viscosity of the thermosetting coating material will become high, so that the curing reaction of the coating material is enhanced, thereby exactly preventing it from flowing out of the mold. In FIG. 8, although the heater is not shown, such a heater may be proved within the heating block in the same manner as shown in FIG. 7(b). In addition, with regard to any type of a mold, a heating block is not necessary to be separated from the mold. Instead, it is always possible that the heating block 131 may be directly buried in the mold.

With the use of the IMC mold 50 formed according to the third aspect of the present invention, since an auxiliary molded body is formed which is however not necessary in forming a common thermoplastic resin product, an additional step becomes necessary to remove the auxiliary molded body after the molding process. In this way, although it is necessary to carry out an additional step to remove the auxiliary molded body, using the mold formed according to the third aspect of the present invention can provide at least the following advantageous as compared with the case where there is existing the coating material leakage. Namely, if a coating material is leaked during an injection molding process, all the molds within the injection molding machine have to be cleaned. As a result, a growing cycle for forming a molded resin product will become undesirably long, resulting in a low productivity. Moreover, since the molded product growing cycle becomes irregular, it is difficult to ensure a constant quality for the molded resin products, resulting in low product quality. Therefore, with the use of the IMC mold 50 formed according to the third aspect of the present invention, it is sure to obtain some remarkable effects including an increased productivity and a more stabilized product quality.

In the following, description will be made to explain about an appropriate condition suitable for carrying out the in-mold coating formation method (IMC) using the IMC mold formed according to the third aspect of the present invention.

In view of the purpose of preventing a coating material leakage, according to the IMC method of the third aspect of the present invention, the temperature of a surface portion on the coating material injection side of the auxiliary cavity is made higher than other portions, so that the coating material spread from the mold cavity can be cured within the auxiliary cavity. One method of forming a temperature distribution within the mold is to perform a temperature control in the same manner as shown in FIG. 7 and FIG. 8. Namely, a heater is buried in the vicinity of a surface portion on the coating material injection side of the auxiliary cavity, thereby forming a heating block and thus facilitating the desired temperature control. In practice, the temperature of the mold at this time may be controlled at an appropriate value by taking into account a curing condition (temperature and time) of a coating material and the thermal plasticity of the resin to be used for molding.

Further, in order to prevent a coating material from flowing out of a mold, it is necessary that the auxiliary cavity be completely filled with a resin to be used for molding. However, in order to completely fill the auxiliary cavity with the resin to be used for molding, it is preferred that a molten resin receives a higher pressure which is higher than a pressure necessary for filling the mold cavity with the resin to be used for molding. Namely, it is preferred that a mold closing force be controlled in a manner such that a high mold closing force may be obtained which is higher than a mold closing force for use in a molding formation process using a mold not having an auxiliary cavity, so that the auxiliary cavity may be filled with the resin to be used for molding, using an injection filling pressure which is higher than a usual injection filling pressure.

Of course, it is also preferred to use the in-mold coating formation apparatus according to the second aspect of the present invention, for carrying out the IMC method described in the third aspect of the present invention.

However, as to the IMC method according to the third aspect of the present invention, although the method may be used to manufacture many kinds of products without any limitation, preferably it is used to produce the following product items including a bumper, a door mirror cover, a fender, a door panel, a back door panel, an over fender, a door handle, a side garnish, a side protector, a wheel cap, all for use in an automobile vehicle, and also including a side cover and a cowl for use in a motorcycle.

Next, description will be given to explain an example of an in-mold coating formation method (IMC) according to a fourth aspect of the present invention, with reference to the accompanying drawings. However, the fourth aspect of the present invention is by no means to be limited to the following specific example.

At first, description will be made to explain one embodiment of the IMC method using the IMC apparatus 100 having the control device 30 constructed in the above described manner. Further, the description will also include an operation of the IMC apparatus 100.

At first, a feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forwardly from its opening limit position in accordance with a mold closing speed pattern (a data signal representing a mold closure operating pattern) set in advance in the mold closing condition setting section 32. Thus, the movable mold portion 52 gets in contact with the fixed mold portion 51. Afterwards, another feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forward still further, in accordance with a mold closing pattern set in advance in the mold closing condition setting section 32. In this way, the tie rod 14 is extended, applying a predetermined mold closing force to the mold device 50.

In this way, according to an operation timing predetermined for operating the mold closing device 10, the opening amount of the injection servo valve 27 is controlled in accordance with a control signal fed from the injection control section 38, while at the same time the screw member 21 is moved forward by virtue of an injection cylinder 24. As fast as this is done, the molten resin accumulated around the front portion of the screw 21 is injected into the mold cavity 53 by way of the nozzle 26, thereby forming a thermoplastic resin molded product. However, in order to form an interlock between the operation of the mold closing device 10 and the operation of the injection device 20, the mold device control section 31 is so formed that the operation timing signals of the two devices may be transmitted therethrough.

Next, the movable mold portion 52 is moved by the mold closing cylinder 13 so that the movable mold portion 52 moves backwardly. Meanwhile, a feedback control is conducted by virtue of a control signal fed from the mold closing control section 33 and also by virtue of a mold closing servo valve 15, while at the same time the mold is opened by a predetermined opening amount set in advance in the mold closing condition setting section 32, thereby forming a gap between the surface of the thermoplastic resin molded product and the internal surface of the mold cavity 53. Then, in accordance with an injection amount of the coating material injection device 55, an injection speed of the coating material, an injection timing and an injection pressure, all set in advance in the mold closing condition setting section 32, the coating material injecting device 55 is driven so that the coating material is injected into the mold cavity 53, by virtue of a control signal fed from an injection apparatus control section 35.

Next, a feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forwardly still further, thereby carrying out a mold opening amount pattern and an in-mold coating material pressure pattern which are all set in advance in the mold closing condition setting section 32. However, in carrying out the in-mold coating material pressure pattern, it is needed to feed back a detected value of the coating material pressure sensor 54.

In this way, an injected coating material is caused to spread over the entire surface of a thermoplastic resin molded product, with attaining at the same time an optimum molding condition for the appearance and the adhesion strength of the coating layer. However, in the case where a mold not having a coating material pressure sensor 54 is used, a mold closing pattern can be set and executed in place of the above in-mold coating material pressure pattern.

After that, a feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves backwardly to arrive at its opening limit position, in accordance with an operation timing and a mold opening speed pattern set in advance in the mold closing condition setting section 32. Then, an integrally formed molded product may be taken out of the mold device 50, thereby completing the cycle of molding one resin product.

Figure 12:
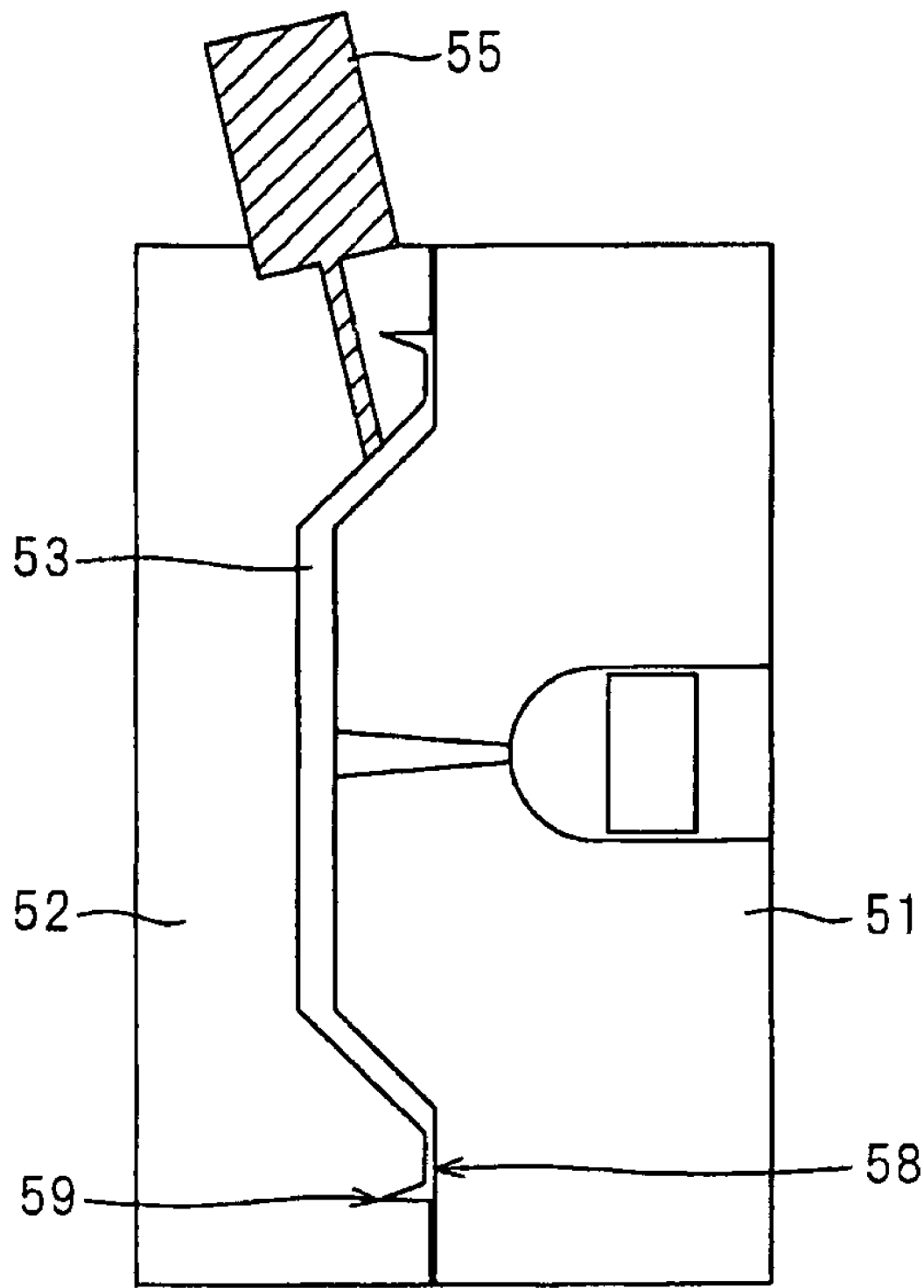
FIG. 12 is a schematic view illustrating an example of the structure of a mold which can be suitably used in an in-mold coating formation method according to a fourth aspect of the present invention.
Figures 13A, 13B, 13C, 13D:
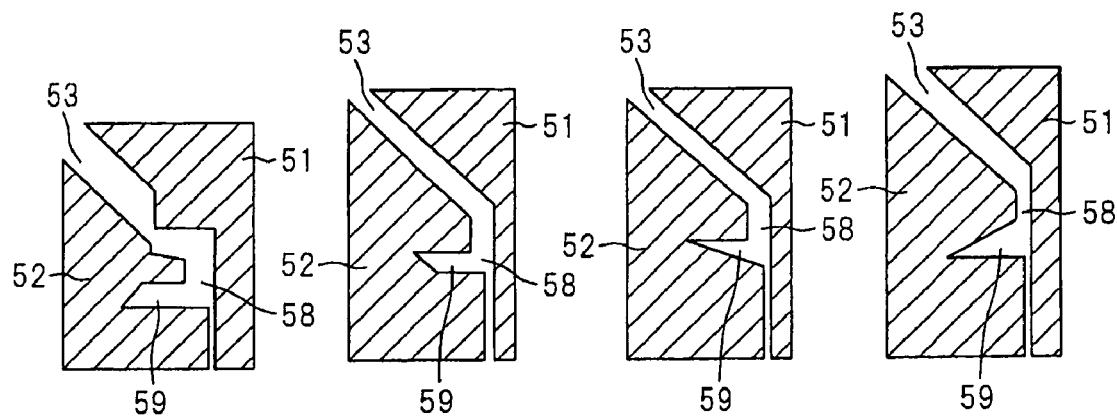
FIGS. 13(a) to 13(d) are schematic views indicating some other examples of the structures of molds which can be suitably used in the in-mold coating formation method according to the fourth aspect of the present invention.
Figures 14A, 14B, 14C, 14D:
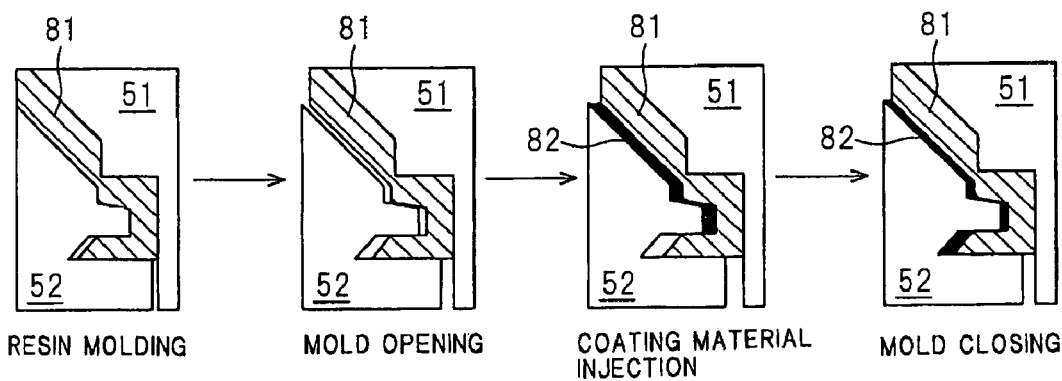
FIGS. 14(a) to 14(d) are schematic views showing the situation of an opening/closing operation of a mold, corresponding to various steps in a molding process using a mold structure effective for the in-mold coating formation method according to the fourth aspect of the present invention, i.e., using a manner as shown in FIG. 13(a). In detail, (a) shows a mold position in which a molded resin product has just been formed, (b) shows a mold position in which the mold has been opened after the formation of the molded resin product, (c) shows a mold position in which a coating material has been just injected, and (d) shows a mold position in which the mold has just been reclosed.

In carrying out the above described IMC method, according to the present invention, the structure of a mold, a molding formation method and a molding formation condition may be made sufficiently appropriate so that the coating material injected in the mold cavity 53 can be prevented from leaking out of the mold. FIG. 12 is an explanatory view schematically indicating one example of a sealing method for effecting a sealing between the mold structure and the coating material.

As shown in FIG. 12, the mold portions 51 and 52 are preferred to be flat parting type mold portions which together form a sub-cavity. Here, the parting surface of the movable mold portion 52 is formed with a sub-cavity 58 which is communicated with the mold cavity 53. Further, the movable mold portion 52 is formed with a groove 59 which is communicated with the sub-cavity 58. Here, the sub-cavity 58 and the groove 59 are not necessarily to be limited to any particular shapes. Instead, they can be formed into various shapes shown in FIGS. 13(a) to 13(d). On the other hand, in order to reduce the production cost for manufacturing the molds, it is preferred that the molds be made simple in their shapes and easy to be processed. However, the sub-cavity 58 and the groove 59 are preferred to be made as small as possible, provided that they are effective in receiving extra amount of a coating material flowing into the parting surfaces of the mold portions 51 and 52.

At first, the mold portions 51 and 52 are used to form a thermoplastic resin molded product. In order to prevent the resin to be used for molding from flowing into the parting surfaces of the mold portions 51 and 52, the parting surfaces of the mold portions 51 and 52 are required to be in a completely contacted position so that an interface thus formed may be completely sealed. Alternatively, an interval between the two parting surfaces is controlled at a predetermined width so that it is possible to make use of the viscosity of the resin to be used for molding under a predetermined molding pressure, so as to prevent the molding resin from flowing into the parting surfaces.

Then, the mold portions 51 and 52 are opened so as to form a predetermined interval therebetween, so that a predetermined amount of a coating material may be injected through the coating material injecting device 55 into the mold cavity 53. As soon as the coating material injection is finished, the mold portions 51 and 52 are closed. At this time, an in-mold coating material pressure should be controlled in a manner such that it becomes 5 MPa to 15 MPa at least in an area where the thermoplastic resin molded product receives the lowest pressure within the mold.

FIGS. 14(a) to 14(d) are used to explain a process including molding of a resin, coating material injection and closing of the mold. In detail, these figures are used to illustrate a condition indicating how a resin product may be molded and how a coating layer can be formed by using the sub-cavity 58 and the groove 59 having the shapes shown in FIG. 13(a). Here, although a resin to be used for molding 81 is caused to fulfill the mold cavity 53 and the sub-cavity 58 and the groove 59, the resin will not flow outwardly to the parting faces of the mold portions 51 and 52.

In this way, the mold portions 51 and 52 are opened so as to form a predetermined interval therebetween, an amount of coating material 82 is then injected between the two mold portions. Subsequently, even though the mold is closed so that the coating material 82 is caused to uniformly spread over the entire surface of the molded resin product 81, an extra amount of the coating material 82 will be received into the groove 59. In this manner, even if the molded resin product 81 is caused to deform to some extent, the coating material can be exactly prevented from flowing out to the parting surfaces of the thus formed mold.

In this way, after a high pressure of 5 MPa to 15 MPa has been applied, an in-mold coating material pressure can be controlled in a manner such that it becomes 0.5 MPa to 2 MPa at least in an area where the thermoplastic resin molded product receives the lowest pressure within the mold. Here, "an area where the thermoplastic resin molded product receives the lowest pressure in the mold" means an in-mold zone which receives the lowest pressure in the mold. In practice, such an in-mold zone is often used to mean the front portion of an auxiliary cavity which is located the farthest from the resin injection section. In this way, by at first applying a high pressure, it is possible for the coating material to flow over the entire surface of the thermoplastic resin molded product, so that coating material can completely cover and tightly adhere to the surface of the molded product, thereby making it sure to have a uniform adhesion strength irrespective of positions of the thermoplastic resin molded product.

Further, by setting pressure at a relatively low level when the coating material is caused to cure, it is possible to obtain an effect obtainable in an example according to the fourth aspect of the invention which will be discussed later. Namely, it is possible to prevent the occurrence of some humps (actually, tubercles which will possibly be formed on the surfaces of some thick portions of a molded product), thereby making it possible to obtain an integrally formed molded resin product having a coating layer formed in a good state.

The basic concept of the in-mold coating formation method (IMC) according to the fifth aspect of the present invention is to effectively make use of a heat held within a molded resin in a mold, so that this heat can be effectively used to cure a thermosetting coating material. In this way, the temperature of the mold is allowed to be set lower than the curing temperature of the coating material so as to improve the productivity. Further, it is also possible to cure a coating material under a predetermined condition so as to obtain a coating layer having good physical properties.

In the following, description will be given to explain in detail an example according to a fifth aspect of the present invention, with reference to the accompanying drawings. However, it should be understood that the fifth aspect of the present invention is by no means to be limited to the following example.

In the following example, it is also preferred to use the in-mold coating formation apparatus (hereinafter, referred to as IMC apparatus) 100 formed by using a common toggle type injection molding machine shown in FIG. 1.

Next, description will be given to explain the operation of the IMC apparatus 100 for carrying out the IMC method of the present invention. In fact, the IMC method is carried out by using the IMC apparatus 100 having the control device constructed in the above described manner. However, since a temperature sensor is used as a control element 54 in this example, the following description will be given to mainly explain a control method involving the use of the temperature sensor.

At first, a feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forwardly from its opening limit position to get in contact with the fixed mold portion 51, in accordance with a data signal representing a mold closing speed (mold closing speed pattern) set in advance in the mold closing condition setting section 32. Soon afterwards, another feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forwardly still further, in accordance with a data signal representing a mold closing force formation condition (mold closing force pattern) set in advance in the mold closing condition setting section 32. In this way, the tie rod 14 is extended so that a predetermined mold closing force is applied to the mold device 50.

A molten resin stored in the front portion of the screw 21 is injected through a nozzle 26 into the mold cavity 53 when the screw 21 is caused to proceed forwardly by the injection cylinder 24, while controlling an opening degree of an injection servo valve 27 according to the control signal fed from the injection control section 38 in predetermined timing during the operation of the mold closing device 10 mentioned above, thereby a thermoplastic resin molded product is formed. However, in order to form an interlock between the operation of the mold closing device 10 and the operation of the injection device 20, the mold device control section 31 is so formed that the operation timing signals of two devices may be transmitted therethrough.

Next, at the time when it is judged that the surface portion of a thermoplastic resin molded product has been cured by virtue of a surface temperature of the molded resin product, a feedback control is conducted by virtue of a control signal fed from the mold closing control section 33 and also by virtue of a mold closing servo valve 15, while at the same time the mold portions 51 and 52 are opened so as to form a predetermined interval therebetween. However, an opening amount of the mold portions 51 and 52 is preferred to be within a range of 0.5 mm to 2 mm. In this way, it becomes possible to inhibit the heat diffusion from the surface of the molded resin product to one of the mold portions. Thus, a heat held in the thermoplastic resin molded product will cause the surface temperature of the molded product to rise to a value which is equal to or higher than the curing temperature of the coating material. Subsequently, in accordance with a coating material injecting amount of the coating material injection device 55, its injection speed and its injection pressure, all set in advance in the mold closing condition setting section 32, the coating material injection device 55 is driven by virtue of a control signal fed from the injection control section 35, so that the coating material is injected into the mold cavity 53.

Afterwards, another feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves forwardly still further, executing a data signal representing a mold opening amount formation condition (mold opening amount changing pattern) and a mold closing force pattern, all set in advance in the mold closing condition setting section 32. In this way, the injected coating material is allowed to spread over the entire surface of the thermoplastic resin molded product, thereby ensuring the most appropriate condition for forming a coating layer having an excellent outside appearance and a high adhesion strength.

Subsequently, a feedback control is conducted by virtue of a control signal fed from the mold closing control section 33 and also by virtue of a mold closing servo valve 15, while at the same time the movable mold portion 52 is moved by the mold closing cylinder 13 so that the movable mold portion 52 moves backwardly to arrive at its opening limit position, in accordance with an operation timing and a mold opening speed pattern set in advance in the mold closing condition setting section 32. Then, an integrally formed molded product may be taken out of the mold device 50, thereby completing the cycle of molding one resin product.

The above description has explained only the basic operation of the IMC apparatus 100. According to the IMC method of the present invention, the injection of the coating material during one cycle of molding is carried out under a condition where the surface temperature of a thermoplastic resin molded product is higher than the curing temperature of the coating material, but with the mold temperature in the mold cavity being lower than the coating material curing temperature. However, a temperature difference between the mold temperature within the mold cavity and the coating material curing temperature is preferred to be set at 20° C. or lower, more preferably in a range of 5 to 10° C.

As described in the above, with the use of the IMC method according to the fifth aspect of the present invention, it becomes possible to employ a temperature of the mold lower than a curing temperature of a coating material by virtue of the effective utilization of heat held in a thermoplastic resin molded product. In this way, it is allowed to reduce a time period necessary for heating and cooling the mold, thereby accelerating the molding cycle and thus improving the productivity. Further, since the curing temperature of a coating material can be used to maintain some predetermined conditions, it is sure for a formed coating layer to obtain good physical properties.

BEST MODEL FOR CARRYING OUT THE INVENTION

Examples

In the following, the present invention will be described in more detail by giving out some examples. However, the present invention should not be limited in its scope to any extent by these examples.

Example 1

A mold having a shear edge structure was used which is capable of producing a case-like product having a height of 300 mm, a width of 210 mm, a depth of 50 mm and a thickness of 3 mm. A thermal resistant ABS resin (commercially available under a trade name "CYCOLAC MX40", manufactured by Ube Cycon. Ltd.) was injection-molded by applying a force of 200 tons as a mold closing force. At this time, the temperature of the resin was 250° C., while the temperature of the mold was 90° C. A cooling time used in the resin molding process was 20 seconds. At this moment, the surface temperature of the thermoplastic resin molded product was about 100° C. Afterwards, the mold was opened by 1.5 mm, 12 cc of coating material A having a gel time of 7 seconds at a temperature of 90° C., as listed in Table 2 was injected under a pressure of 12 MPa. 2.5 Seconds were required in the injection of the coating material. 0.1 Second after the injection of the coating material, the mold began to be closed again, by applying a mold closing force not larger than 20 tons within one second. Then, after the mold had been kept in position for 120 seconds, the mold was opened and molded product was taken out. It was found that thus molded product had been covered up by a uniformly formed coating layer having a thickness of 100 μm, but without having any mottles, wrinkles and cracks thereon.

Example 2

A mold used in Example 1 was used. Then, in the same manner as in Example 1, an amount of polyamide resin (commercially available under a trade name "UBE NYLON PA1013B", manufactured by Ube Industries, Ltd.) was injection-molded by applying a force of 300 tons as a mold closing force. At this time, the temperature of the resin was 250° C., while the temperature of the mold was 120° C. A cooling time used in the resin molding process was 20 seconds. At this moment, the surface temperature of the thermoplastic resin molded product was about 140° C. Afterwards, the mold was opened by 1.5 mm, 12 cc of coating material B having a gel time of 8 seconds at a temperature of 120° C., as listed in Table 2 was injected under a pressure of 11 MPa. Two seconds were required in the injection of the coating material. Three seconds after the injection of the coating material, the mold began to be closed again, by applying a mold closing force not larger than 20 tons within 3 seconds. Then, after the mold had been kept in position for 120 seconds, the mold was opened and molded product was taken out. It was found that thus molded product had been covered up by a uniformly formed coating layer having a thickness of 100 μm, but without having any weld line of an aluminum flake pigment, its orientation irregularities, wrinkles and cracks.

Comparative Example 1

The same mold, resin to be used for molding and coating material as used in Example 1 were used in this comparative example. The time required for from the start of the reclosing of the mold to the completion of the reclosing of the mold after the completion of injecting the coating material was set at 5.5 seconds. The molding was carried out under the same conditions as in Example 1 except for those mentioned above. It was found that a coated resin product thus obtained has wrinkles and black stripe-like color irregularities formed along the flow path of the coating material. As a result, molded product having a uniform coating layer could not be obtained.

Comparative Example 2

The same mold, resin to be used for molding and coating material as used in Example 2 were used in this comparative example. The time for the injection of the coating material was set at 0.5 seconds. The molding was carried out under the same conditions as in Example 2 except for those mentioned above. It was found that a coated resin product thus obtained has weld lines made of aluminum flake orientation irregularities and color irregularities caused due to a color pigment. As a result, molded product having a uniform coating layer could not be obtained.

TABLE 2

| Components | Coating materials A | Coating materials B |
|---|---|---|
| Urethane acrylate oligomer (1) | 100.0 | 50.0 |
| Urethane acrylate oligomer (2) | — | 50.0 |
| Tripropylene glycol diacrylate | 57.0 | 30.0 |
| Styrene | 3.0 | 30.0 |
| Titanium oxide | 150.0 | — |
| Carbon black | 0.1 | — |
| Aluminum pigment (1) | — | 0.2 |
| Aluminum pigment (2) | — | 0.8 |
| Urethane acrylate oligomer (1) | 1.7 | 1.6 |
| Zinc stearate | — | 1.6 |
| Photo stabilizer TINUVIN 1130 | — | 0.8 |
| 8% cobalt octoate | 0.5 | 0.2 |
| Bis(4-t-butylcyclohexyl) peroxy carbonate | 2.5 | — |
| t-almyl-peroxy-2-ethylhexanoate | — | 2.0 |

Urethane acrylate oligomer (1) Molecular weight: 2,500
Urethane acrylate oligomer (2) Molecular weight: 6,500
Aluminum pigment (1) Average particle diameter: 30 μm Aspect ratio: 30
Aluminum pigment (2) Average particle diameter: 25 μm Aspect ratio: 2
Tinuvin: registered trademark of Ciba-Geigy Co., Ltd.

Example 3

Figure 4A:
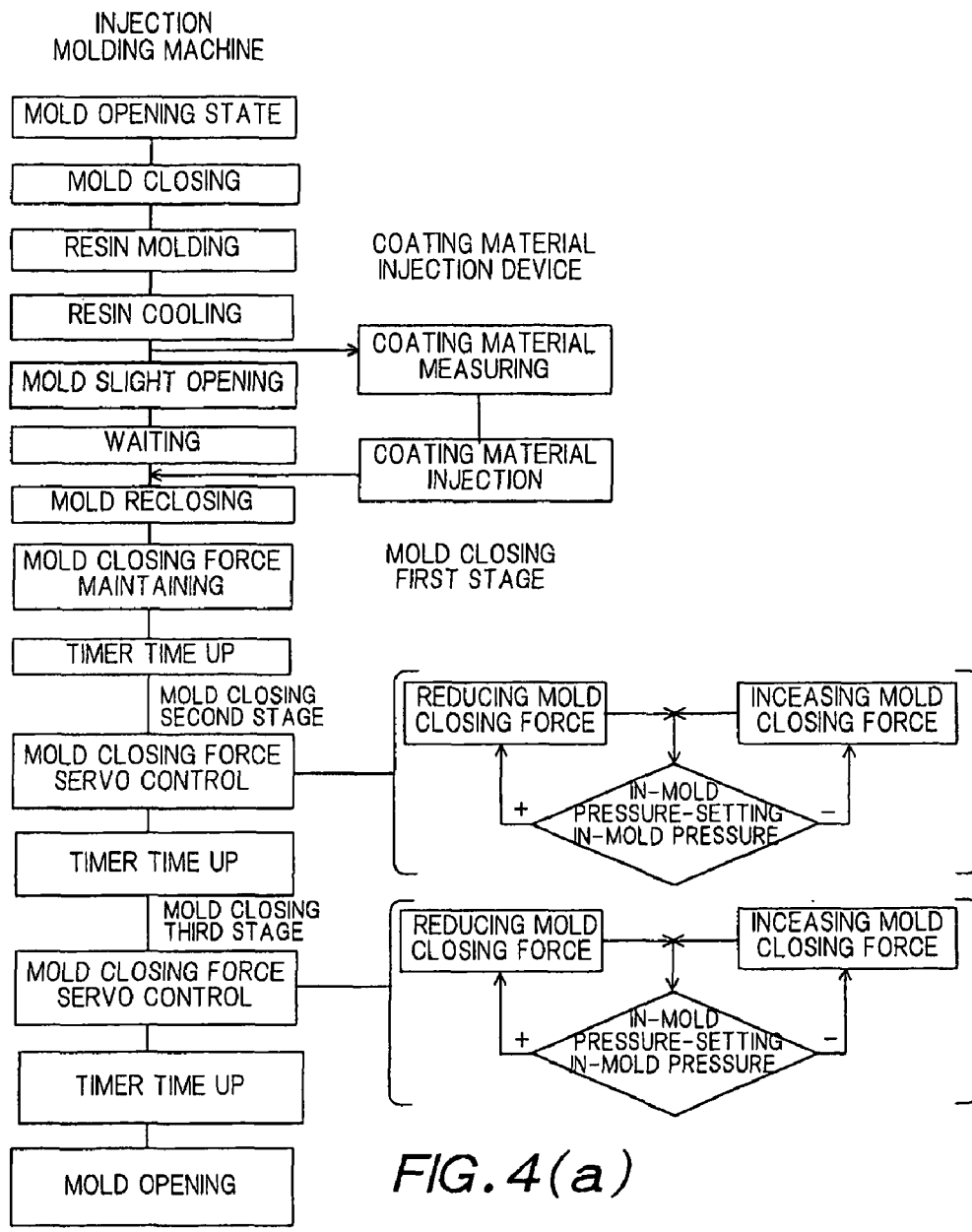
FIG. 4(a) is a flow chart indicating a molding process according to example 3 which can be conducted with the use of the in-mold coating formation apparatus shown in FIG. 1. (b) is a diagram indicating an example of a sequence for mold closing and mold opening, for use in the same example.
Figure 4B:
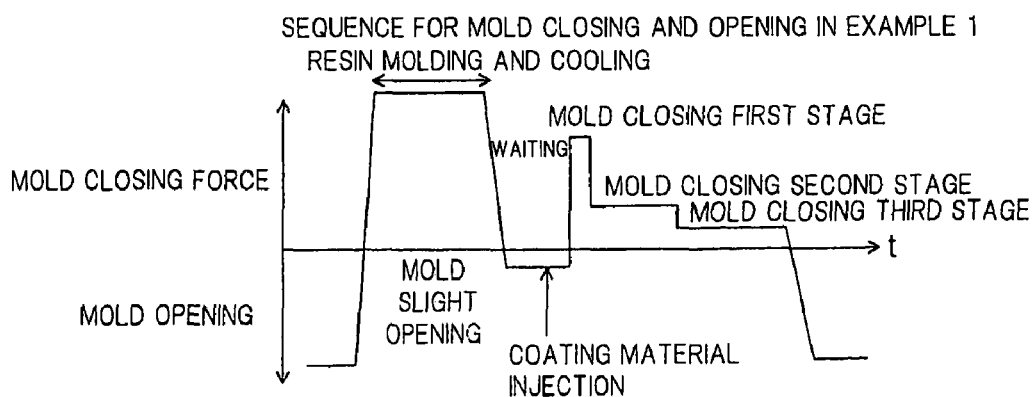

FIG. 4(a) shows a flow chart for the molding steps of Example 3 under a condition described later in detail by using an IMC apparatus 100 shown in FIG. 1. FIG. 4(b) shows a sequence for mold closing and opening. A mold having a shear edge structure was used which is capable of producing a case-like product having a height of 300 mm, a width of 210 mm, a depth of 50 mm. Firstly, a Nylon 6 (commercially available under the trade name "UBE NYLON PA1013B", manufactured by Ube Industries. Ltd.) was injection-molded by applying a force of 350 tons as a mold closing force. At this time, the temperature of the resin was 250° C., while the temperature of the mold was 130° C.

Thirty seconds was spent as a cooling time for the molded resin. Afterwards, the mold was opened by 0.5 mm. Then, the mold was kept at such an opened position for 10 seconds. Afterwards, 13 cc of coating material having a good adhesiveness to Nylon 6 and having a gel time of 8 seconds at a temperature of 130° C. was injected into a space formed between the thermoplastic resin molded product and the internal surface of the mold. Two seconds were spent for the injection of the coating material. Three seconds after the injection of the coating material, the mold began to be closed again, with applying a mold closing force of 100 tons for one second. Approximately 1.0 second was required to increase a pressure as desired (increase a mold closing force). Subsequently, another mold closing force for a second mold closure step was applied within a time period of 50 seconds in a manner such that a coating material pressure sensor would arrive at its predetermined pressure value of 3.0 MPa. After that, a further mold closing force for a third mold closure step was applied within a time period of 50 seconds in a manner such that a coating material pressure sensor would arrive at its predetermined pressure value of 2.0 MPa.

A finally obtained molded product was found to have been completely covered by a coating layer having a thickness of 100 µm. As proved in this example, if a pressure within the mold after the injection of a coating material is caused to change in such a manner that said pressure is high immediately after the coating material injection and then drops gradually, the coating material can more uniformly spread within the mold. Further, since it is also allowed to use a coating material having a high viscosity, a selectable rang for selecting a usable coating material has become broader than before.

However, an adhesion strength of a coating layer when it adheres to an integrally molded product was evaluated in a test called lattice pattern cellophane tape test prescribed in JIS K-5400 (General Testing Method for Coating Material). As a result, no peeling-off was found in the coating layer in 100 lattices of the lattice pattern, thereby proving that the obtained coating layer has a high adhesion strength.

Example 4

Figure 3:
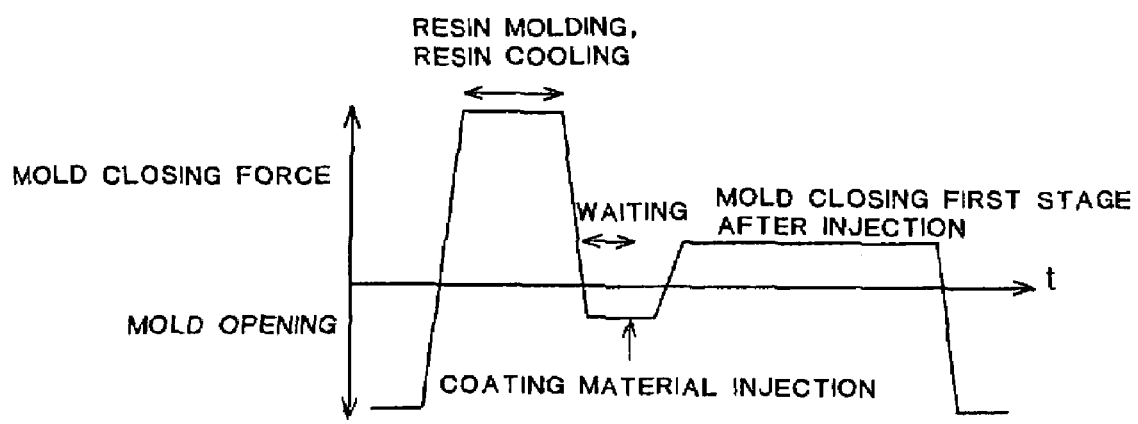
FIG. 3 is a diagram indicating an example of a sequence for mold closing and mold opening, in a molding process using the in-mold coating formation apparatus shown in FIG. 1.
Figure 5:
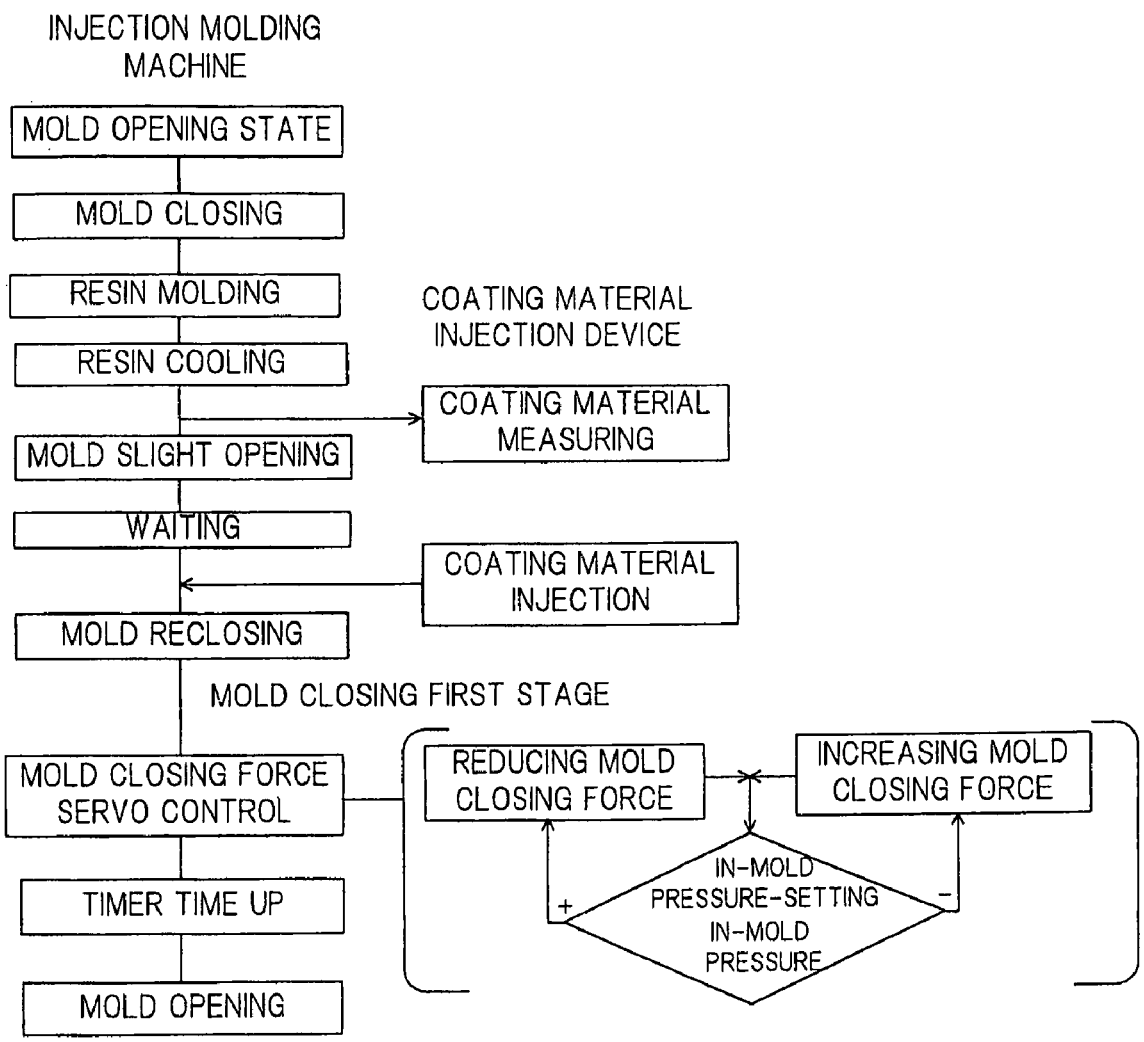
FIG. 5 is a flow chart indicating a molding process according to example 4 which can be conducted with the use of the in-mold coating formation apparatus shown in FIG. 1.

FIG. 5 shows a flow chart indicating a molding process for use in this example under a condition described later by using an IMC apparatus 100 shown in FIG. 1. Furthermore, a sequence for mold opening was the same as that shown in FIG. 3.

In detail, a mold having a shear edge structure was used which is capable of producing a case-like product having a height of 300 mm, a width of 210 mm, a depth of 50 mm. At first, a thermal resistant resin (commercially available under a trade name "MX40", manufactured by Ube Industries. Ltd.) was injection-molded under the application of a force of 350 tons as a mold closing force. At this time, the temperature of the resin was 250° C., while the temperature of the mold was 90° C.

Thirty seconds were spent as a cooling time for the molded resin. Afterwards, the mold was opened by 1.0 mm. Subsequently, 13 cc of coating material having a good adhesiveness to an ABS resin and having a gel time of 7 seconds at a temperature of 90° C. was injected into a space formed between the thermoplastic resin molded product and the internal surface of the mold. Two seconds were needed in the injection of the coating material. Soon after the injection of the coating material, the mold was closed rapidly. At this time, about 1.5 seconds were needed in increasing the mold closing force. The mold closing force was set at only one step. Such a mold closing force was applied during 120 seconds in a manner such that a coating material pressure sensor would arrive at its predetermined pressure value of 3.0 MPa.

A finally obtained molded product was found to have been completely covered by a coating layer having a thickness of 100 µm. The molded product has formed thereon a coating layer whose thickness uniformity was just as good as that in Example 3. Therefore, it is understood that for some kinds of coating materials it is not necessary to use a multi-stage mold closing force. Further, similar to Example 3, an adhesion strength of a coating layer when it adheres to an integrally molded product was evaluated in a test called lattice pattern cellophane tape test prescribed in JIS K-5400 (General Testing Method for Coating Material). As a result, no peeling-off was found in the coating layer in 100 lattices of the lattice pattern, thereby proving that the obtained coating layer has a high adhesion strength.

Example 5

Figure 6:
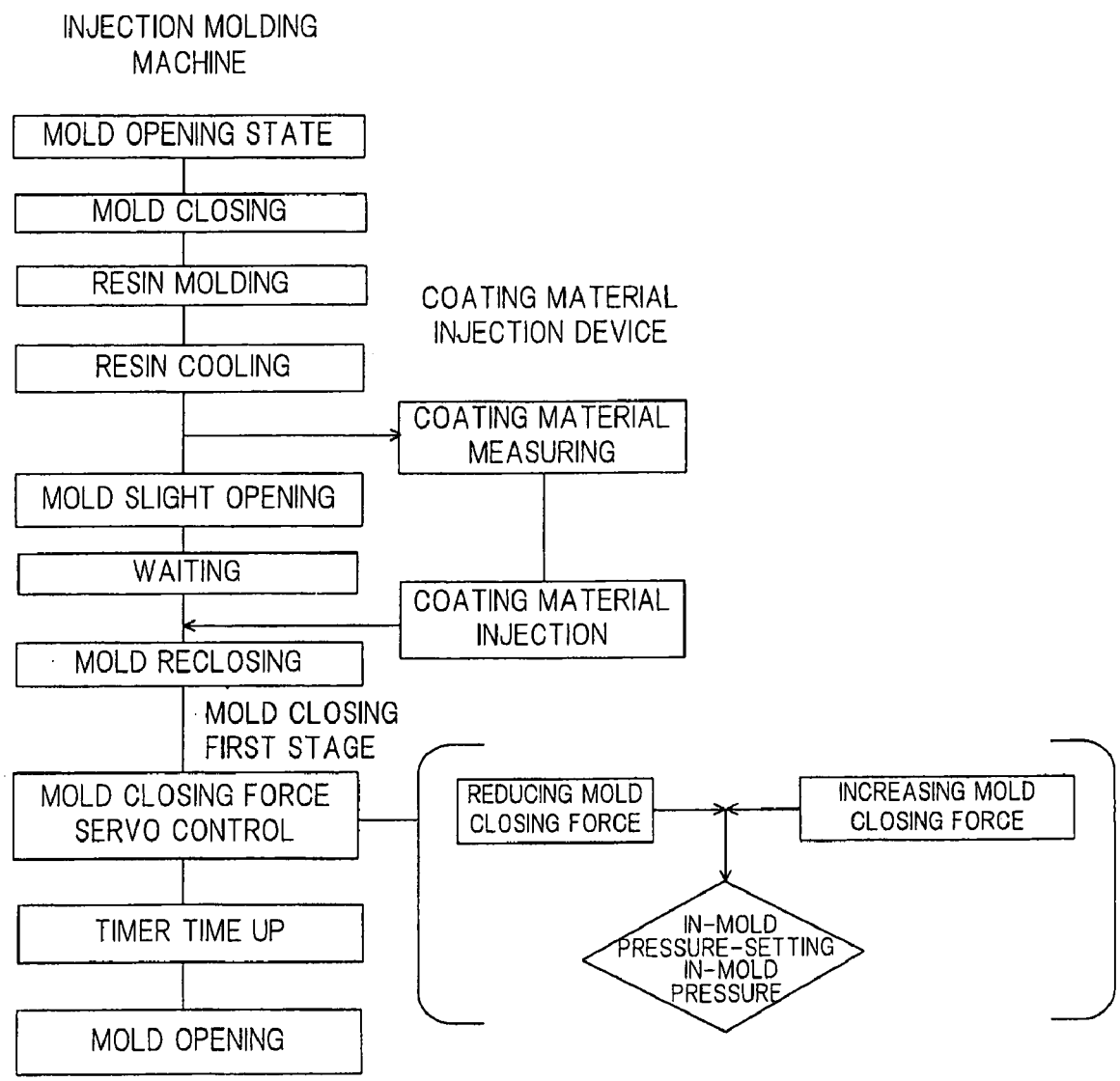
FIG. 6 is a flow chart indicating a molding process according to example 5 which can be conducted with the use of the in-mold coating formation apparatus shown in FIG. 1.

FIG. 6 shows a flow chart indicating a molding process for use in this example under a condition described later by using the IMC apparatus shown 100 in FIG. 1. Moreover, a sequence for mold opening was the same as that shown in FIG. 3.

In detail, a mold of a flat parting type was used which is capable of producing a generally triangular product which can serve as a side cover for use in a motor bike, having a height of 320 mm and a width of 180 mm. At first, a thermal resistant ABS resin (commercially available under a trade name "MX40", manufactured by Ube Cycon. Ltd.) was injection-molded by applying a force of 300 tons as a mold closing force. Here, a rib for preventing the leakage of a coating material was formed along the entire circumference of the mold, a resin molding gate is provided on a surface which is just opposite to the coating material injection surface. At this time, the temperature of the resin was 250° C., while the temperature of the mold was 90° C.

Thirty seconds were spent as a cooling time the molded resin. Afterwards, the mold was opened by 1.0 mm. Subsequently, 4 cc of coating material having a good adhesiveness to ABS resin and having a gel time of 7 seconds at a temperature of 90° C. was injected into a space formed between the thermoplastic resin molded product and the internal surface of the mold. One second was needed in the injection of the coating material. Soon after the injection of the coating material, the mold was closed rapidly. At this time, about 0.8 seconds were needed in increasing the mold closing force. The mold closing force was set at only one step. Such a mold closing force was applied during 120 seconds in a manner such that a coating material pressure sensor would arrive at its predetermined pressure value of 3.0 MPa.

A finally obtained molded product was found to have been completely covered by a coating layer having a thickness of 100 µm. Further, similar to Examples 3 and 4, an adhesion strength of a coating layer when it adheres to an integrally molded product was evaluated. As a result, no peeling-off was found in the coating layer in 100 lattices of the lattice pattern, thereby proving that the obtained coating layer has a high adhesion strength. Further, as indicated by the results of this example, if a feedback control is conducted using a coating material pressure sensor, the IMC method for dealing with a thermoplastic resin using a flat parting type mold can be carried out without any difficulty.

Example 6 and Comparative Example 3

A mold having a shear edge structure was used which is capable of producing a case-like product having a height of 300 mm, a width of 210 mm, a depth of 50 mm. Such a mold was equipped with a coating material injection device capable injecting a predetermined amount of a coating material. An injection molding machine of 350 tons was used which is a toggle mold closing type, capable of optionally changing the mold closing force. After ABS resin was injection-molded, a coating material consisting of components listed in Table 3 and having a gel time of 7 seconds was injected into the mold cavity, thereby forming a coating layer on the surface of a thermoplastic resin molded product. Although molding conditions in this example are substantially the same as those used in other examples, this example employed a mold shown in FIG. 9 and also used a heater (not shown) to perform a predetermined heating treatment so that the temperature of the heating block 132 was elevated to 120° C., while other portions of the mold were kept at 90° C.

TABLE 3

| Components | Weight percent (%) |
| --- | --- |
| Urethane acrylate oligomer *1 | 16.0 |
| Epoxy acrylate oligomer *2 | 16.0 |
| Styrene | 22.0 |
| Zinc stearate | 0.3 |
| Titanium dioxide | 45.0 |
| Carbon black | 0.1 |
| 8% cobalt octoate | 0.6 |
| t-butylperoxy-2-ethylhexanoate | 1.0 |

*1 Urethane acrylate oligomer: molecular weight; 2,500
*2 Epoxy acrylate oligomer: molecular weight; 540

Here, the general structure of a mold formed according to Example 6 is as shown in FIG. 9. An IMC mold 150 is comprised of a fixed mold portion 51 and a movable mold portion 52. The fixed mold portion 51 includes a sprue portion 154 for injecting an amount of resin, a coating material injection device 55 for injecting a coating material, and a heating block 132. The movable mold portion 52 has been processed into a structure containing an auxiliary cavity 7. In fact, the mold has been formed into a structure which ensures that an auxiliary molded body 44 will be integrally formed with a molded product 43 formed in the mold cavity.

The auxiliary cavity 7 is formed as having a length of 10 mm, a thickness of 0.3 mm, so that it is communicated with the mold cavity and extends along the entire circumference thereof. However, as will be discussed later in the present specification, the auxiliary cavity 7 is formed at its corner with a portion having a thickness which is at most 0.6 mm, thereby making it possible to avoid a problem possibly caused due to an insufficiency in process precision. Further, the precision of the length of the auxiliary cavity 7 was controlled within a range of +0.2 mm.

Figure 10:
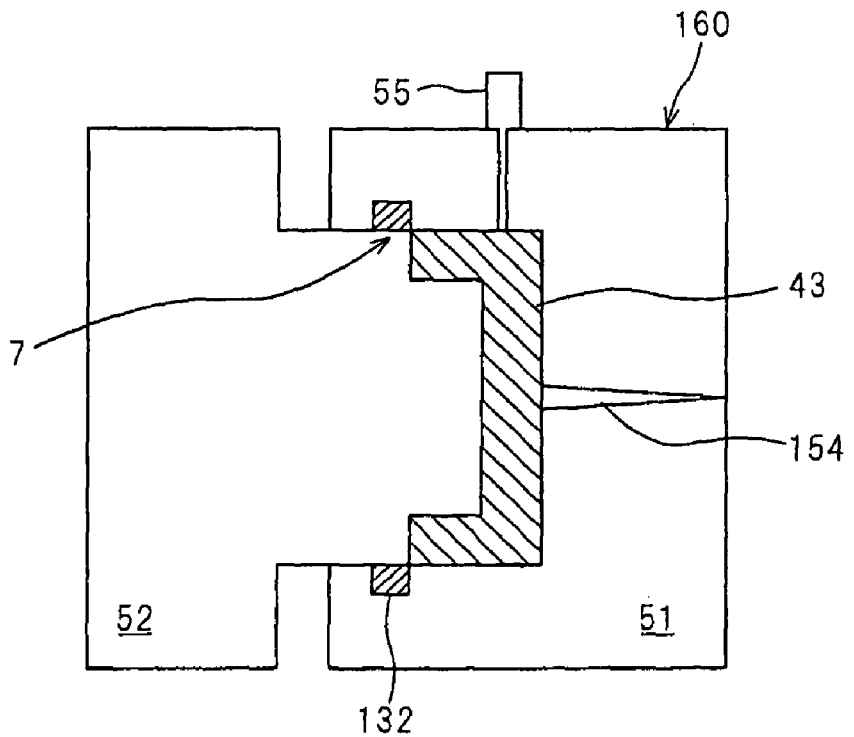
FIG. 10 is a view schematically indicating an example of a conventional in-mold coating formation mold which formed with an auxiliary cavity.

On the other hand, a mold 160 used in Comparative Example 3 is as shown in FIG. 10. Its fixed mold portion 51 is just the same as the fixed mold portion 51 of the IMC mold 150 shown in FIG. 9. However, its movable mold portion 52 has a shear edge portion which is just the same as a conventional one, while the mold as a whole does not have an auxiliary cavity.

In the Comparative Example 3, molded products were made in the same conditions as used in Example 6, except that a mold used is an IMC mold 160 not having an auxiliary cavity. Namely, the temperature of a heating block 132 is set to be 120° C., while other portions of the mold were kept at a temperature of 90° C.

After the coating material has been cured, the mold was opened and the molded product was taken out. The molded product thus obtained was checked to investigate how the coating material was flowing within the mold and whether the coating material had leaked out of the mold.

Figure 11:
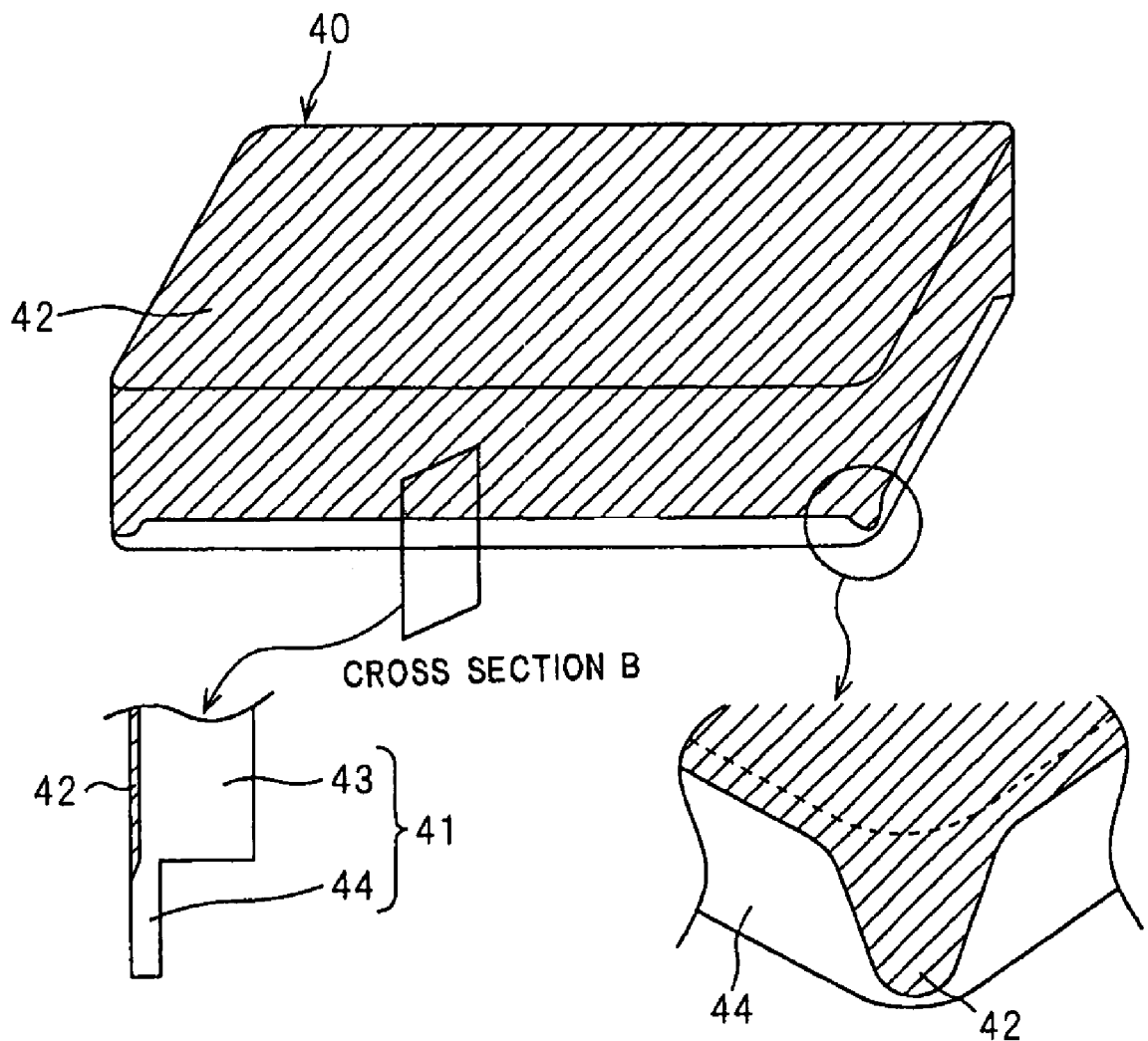
FIGS. 11(a) to 11(c) are explanatory views schematically indicating a molded product formed by using the in-mold coating formation mold according to the third aspect of the present invention. In detail, (a) is a schematic view illustrating an example of a molded product formed by using the in-mold coating formation mold shown in FIG. 7. (b) is an enlarged view partly indicating a sectional surface B of the molded product. (c) is another enlarged view partly indicating a corner portion of the bottom of the molded product.

FIG. 11 is an explanatory view indicating a molded product made with the use of the IMC mold 50 which is formed according to the fourth aspect of the present invention. A cross section B in the figure represents a section on one side surface of the molded product 40, providing an enlarged view indicating how the coating layer 42 was formed on the corner portion of the mold. In fact, the molded product 40 is comprised of a resin molded portion 41 and a coating layer portion 42. The resin molded portion 41 includes a molded product main body 43 and an auxiliary molded portion 44. As shown in FIG. 11, the coating material was stopped in the auxiliary molded portion 44 of the molded product 40, without any leakage of the coating material to the outside of the mold. Further, the corner portion of the auxiliary molded portion 44 has a thickness of 0.6 mm, allowing a deeper flow of the coating material than other portions of the molded product, but preventing the coating material from flowing out of the mold.

However, when the IMC mold 150 was used which was formed according to the fourth aspect of the present invention, and when a molded product was manufactured under a condition where the temperature of the heating block 132 was set at 90° C. which is the same temperature as those of other portions of the mold, it was found that the coating material had leaked only in part of the corner portion where the auxiliary molded portion was thick. Accordingly, in order to ensure a high precision in forming an auxiliary cavity, if an auxiliary cavity has an undesirably large thickness, a necessary treatment for preventing any possible trouble is only to make longer the length of the auxiliary cavity to such an extent that any possible leakage of a coating material may be effectively prevented. In addition, it can be understood that if an auxiliary cavity has been formed with a satisfactory precision, the provision of a heating block is no longer necessary.

On the other hand, when an IMC mold 160 was used which belongs to a conventional type as used in the Comparative Example 3, even if the temperature of the heating block 132 was set at 120° C., the coating material was found to have leaked from the shear edge portion. As a result, it was necessary to wipe off the leaked coating material. Thus, by analyzing the test results obtained in the test where the IMC mold 150 was used and the temperature of the heating block 132 was changed, it can be expected that if the IMC mold 160 used in the Comparative Example 3 is employed and if the temperature of the heating block 132 is set at 90° C. which is the same temperature as those of other portions of the mold, there would be too much a leakage of a coating material than the case in which the heating block 132 is set at a temperature of 120° C. Further, such kind of coating material leakage was actually confirmed by the experiment.

Comparative Example 4

Figure 15A:
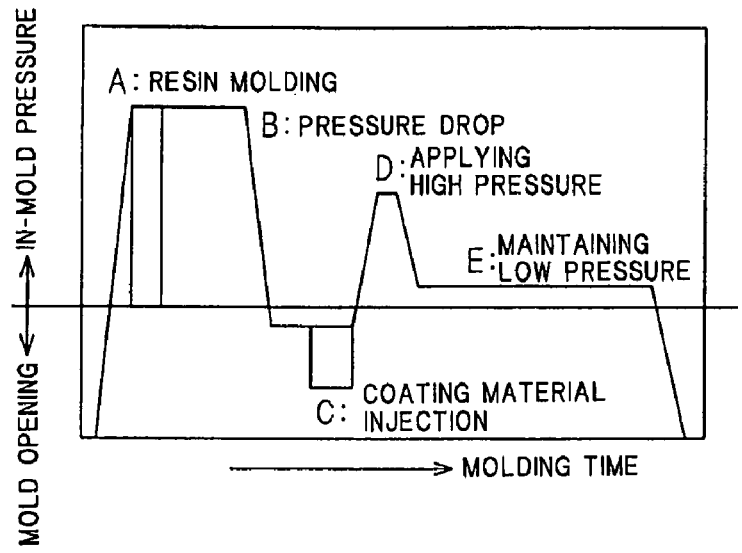
FIGS. 15(a) to 15(c) are used to illustrate some examples according to the fourth aspect of the present invention, a molding process according to a comparative example, a molded product obtained in the molding process. In detail, (a) shows a sequence for opening/closing a mold, (b) shows the shape of a molded product obtained in Comparative Example 4, and (c) shows the shape of a molded product obtained in example 7.
Figure 15B:
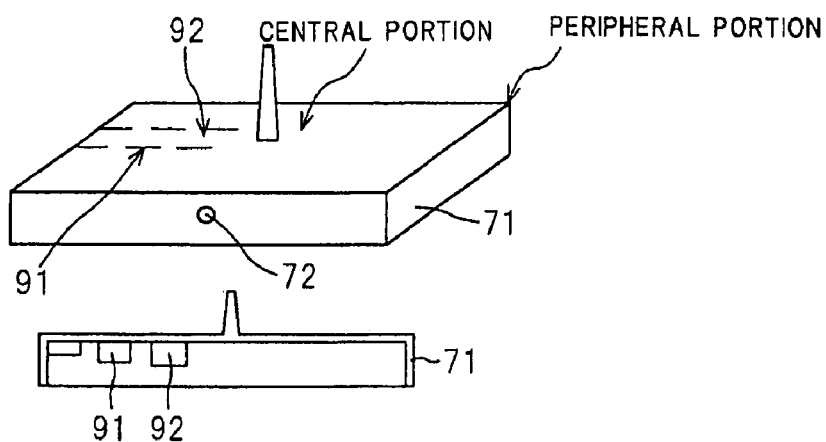

A mold having a shear edge structure was used which is capable of producing a case-like product 71 having a height of 300 mm, a width of 210 mm and a depth of 50 mm, as shown in FIG. 15(b). An injection molding machine used was 350-ton injection molding apparatus capable of optionally changing its mold closing force. Also, an injection device was used which is capable of injecting a necessary amount of coating material. A coating material including the components listed in Table 4 and having a gel time of 7 seconds, was injected into the mold, followed by changing the internal pressure within the mold. Then, the hump size of the molded product, an adhesion strength between the coating material and the molded product were all investigated.

TABLE 4

| Components | Weight percent (%) |
|---|---|
| Urethane acrylate oligomer *1 | 16.0 |
| Epoxy acrylate oligomer *2 | 16.0 |
| Styrene | 22.0 |
| Zinc stearate | 0.3 |
| Titanium dioxide | 45.0 |
| Carbon black | 0.1 |
| 8% cobalt octoate | 0.6 |
| t-butylperoxy-2-ethylhexanoate | 1.0 |

*1 Urethane acrylate oligomer: molecular weight; 2,500
*2 Epoxy acrylate oligomer: molecular weight; 540

FIG. 15(a) is an explanatory view indicating a pressure applying pattern of an IMC method used in the present comparative example. At first, a mold having a shear edge structure was used which is capable of producing a case-like product as shown in FIG. 15(b). Then, a mold closing force of 350 tons was applied and an amount of usual grade Nylon 6 (commercially available under a trade name "UBE NYLON 1013B", manufactured by Ube Industries. Ltd.) was injection molded, thereby forming a molded product 71. However, as shown in FIG. 15(b), the bottom of the molded product 71 has been processed into a configuration including ribs 91 (each having a thickness of 3 mm) and ribs 92 (each having a thickness of 5 mm). In FIG. 15(b), a reference numeral 72 represents an opening for injecting a coating material.

After the molded product 71 was formed, the mold was opened by 1 mm, so that a coating material for forming a desired coating layer was injected. At this time, the temperature of the mold was 120° C. Upon the completion of the injection of the coating material, the mold closing force was rapidly increased and was then kept at this state for one second. Subsequently, the mold closing force was reduced rapidly. At this moment, about 2 seconds were needed in a process from the start of increasing the mold closing force until the arrival of a low mold closing force. Since the mold closing force in the mold is all applied to the projection plane of the molded product, an in-mold pressure will be a value obtainable by dividing the mold closing force with the projected area.

In the present comparative example, as shown in FIG. 15(a), a mold closing force at a time of zone D (high pressure applying zone) and a mold closing force at a time of zone E (low pressure maintaining zone) were changed so as to change the in-mold pressure. The molded product 71 obtained under such a condition was checked to investigate whether and to what extent some humps (tubercles on the surface of the molded product) had occurred in the vicinity of the ribs 91 and ribs 92, also to investigate an adhesion strength of the formed coating layer. Here, humps were investigated by measuring the size of tubercles in the vicinity of ribs each having a width of 3 mm, with the use of a contour shape measuring device manufactured by Tokyo Seimitsu Co., Ltd. Tubercles having a size of 10 μm or larger are represented by "x", those having a size less than 10 μm are represented by "○". Further, the adhesion strength of each coating layer was evaluated in a test called lattice pattern cellophane tape test prescribed in JIS K-5400 (General Testing Method for Coating Material). Here, "x" represents a case where at least one peeling-off was found in the coating layer in 100 lattices of the lattice pattern, "○" represents a case where not even one peeling-off was found in the coating layer in 100 lattices of the lattice pattern. The test results are shown in Table 5.

TABLE 5

Measured results of in-mold pressure, hump and adhesion strength

| Sample No. | Pressure in zone D (MPa) | Pressure in zone E (MPa) | Hump | Adhesion strength (central portion) | Adhesion strength (Peripheral portions) |
|---|---|---|---|---|---|
| 1 | 10.0 | 10.0 | ○ | ○ | x |
| 2 | 8.0 | 8.0 | ○ | ○ | x |
| 3 | 5.0 | 5.0 | ○ | ○ | x |
| 4 | 3.0 | 3.0 | x | x | x |
| 5 | — | 2.0 | x | x | x |
| 6 | 1.0 | 1.0 | x | x | x |
| 7 | 0.5 | 0.5 | x | x | x |
| 8 | 10.0 | 1.0 | ○ | ○ | x |
| 9 | 5.0 | 0.5 | ○ | ○ | x |

In Table 5, a pressure in zone D means an in-mold pressure at a time of zone D (high pressure applying zone) shown in FIG. 15(a), a pressure in zone E means an in-mold pressure at a time of zone E (low pressure maintaining zone) shown in FIG. 15(a). Further, as to the results of an adhesion strength test, a central portion adhesion strength means a test result obtained by measuring an adhesion strength in the vicinity (refer to FIG. 15(b)) of the center of the bottom of the molded product, whereas a peripheral portion adhesion strength means a test result obtained by measuring an adhesion strength in the vicinity (refer to FIG. 15(b)) of a vertical surface of the bottom of the molded product. Further, in the present comparative example, the adhesion strength of each coating layer, as in the cases of sample numbers 1 to 3, 8 and 9, when a pressure in zone D was 5.0 MPa or higher, the central portion gave relatively good test results while the peripheral portions gave only bad test results. Further, as in the cases of sample numbers 4 to 7, when a pressure in zone D was less than 5.0 MPa, the central portion failed to give relatively good adhesion strength.

The above results may be explained as follows. Namely, in a mold having the shear edge structure, it is impossible to completely prevent the leakage of a coating material. As a result, the in-mold pressure will become high in the central portion, but will become low in the peripheral portions. However, it is understood that a high pressure in zone D will be useful for avoiding the occurrence of humps.

Example 7

Figure 15C:
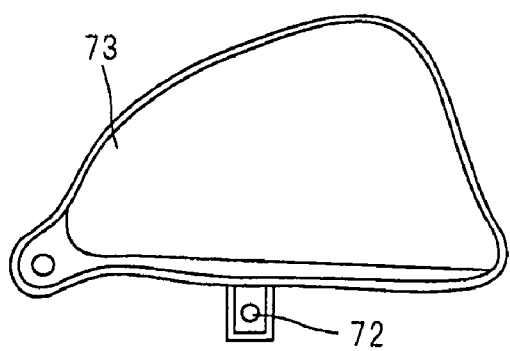

A flat parting type mold was used which has parting surfaces and has ribs for preventing coating material leakage around the entire circumference of a molded product 73, as shown in FIG. 15(c). Such a mold was capable of producing a generally triangular molded product 73 having a height of 320 mm and a width of 180 mm, having a configuration of a side cover for use in a motor bike. Here, an injection molding machine, an injection device and a coating material, which are all the same as those used in the above comparative example, were employed in this Example. In fact, an in-mold pressure after the injection of a coating material was changed, thereby obtaining a desired molded product coated with a coating layer. Finally, the humps of each molded product were checked, an adhesion strength of each coating layer was also investigated.

The molding process was conducted in the same manner as in Comparative Example 4. At first, an amount of standard Nylon 6 (commercially available under the trade name "UBE NYLBN 1013B", manufactured by Ube Industries. Ltd.) was injection molded in an injection molding machine. Then, the mold was opened so as to form a gap of 1 mm, and an amount of coating material having a gel time of 7 seconds (listed in Table 4) was injected into the gap. Subsequently, a mold closing force was applied within one second so that the in-mold pressure would arrive at a value as shown in Table 6. Once the coating material had spread over the entire molded product within the mold, the mold closing force was rapidly reduced. At this time, an in-mold pressure was not a value calculated from the mold closing force, but a value directly measured with the use of an ejector pin. After the coating material had been cured for 120 seconds, the molded product was taken out from the mold. The humps and the adhesion strength were measured in the same manner as in the above comparative example. The results of this example are listed in Table 6.

TABLE 6

Measured results of in-mold pressure, hump and adhesion strength

| Sample No. | Pressure in zone D (MPa) | Pressure in zone E (MPa) | Hump | Adhesion strength (central portion) | Adhesion strength (Peripheral portions) |
|---|---|---|---|---|---|
| 10 | 10.0 | 3.0 | x | ○ | ○ |
| 11 | 10.0 | 1.0 | ○ | ○ | ○ |
| 12 | 10.0 | 0.5 | ○ | ○ | ○ |
| 13 | 3.0 | 1.0 | ○ | x | x |
| 14 | 2.0 | 1.0 | ○ | x | x |

In Table 6, a pressure in zone D means an in-mold pressure at a time of zone D (high pressure applying zone) shown in FIG. 15(a), a pressure in zone E means an in-mold pressure at a time of zone E (low pressure maintaining zone) shown in FIG. 15(a). Further, as to the results of an adhesion strength test, a central portion adhesion strength means a test result obtained by measuring an adhesion strength in the vicinity (refer to FIG. 15(b)) of the center of the bottom of the molded product, whereas a peripheral portion adhesion strength means a test result obtained by measuring an adhesion strength in the vicinity (refer to FIG. 15(b)) of a vertical surface of the bottom of the molded product. However, it is understood that since the mold used in this example has a structure of preventing the leakage of a coating material, an internal pressure in the peripheral portions of the molded product was the same at that in the central portion thereof. Accordingly, as in the cases of sample numbers 11 and 12, if a pressure in zone D is kept at a sufficiently high level while a pressure in zone E is kept at a low value, it is possible to prevent the occurrence of humps, thereby ensuring a relatively high adhesion strength for the entire product. On the other hand, in the case of sample number 10, some humps had occurred due to a high pressure in zone E. Moreover, in the cases of sample numbers 13 and 14, we were not be able to obtain a good adhesion strength because a pressure in zone D was low.

Example 8

Figure 16:
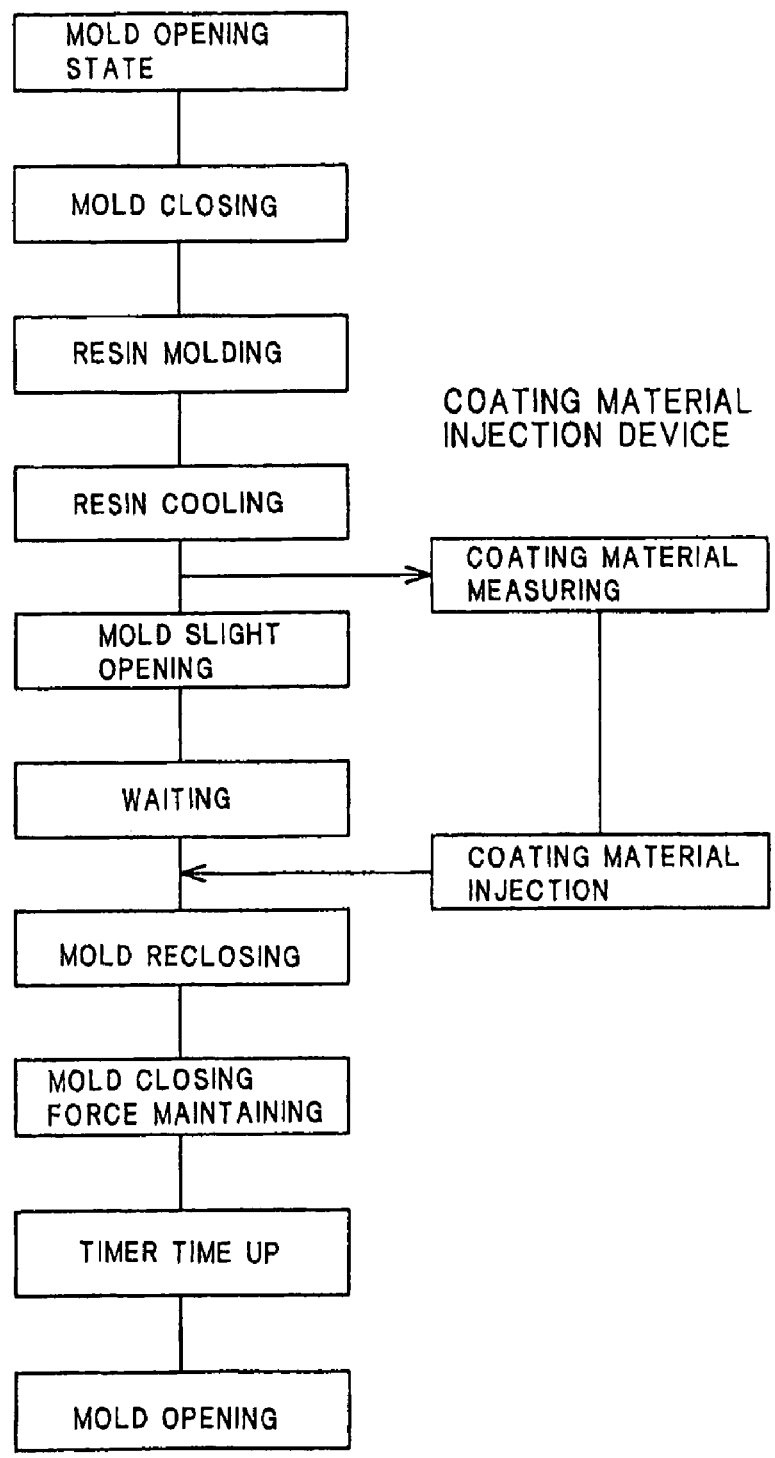
FIG. 16 is a flow chart indicating a molding process according to Example 8 which can be carried out with the use of the in-mold coating formation apparatus shown in FIG. 1.

FIG. 16 shows a flow chart and a sequence for mold closing and mold opening, which are designed to carry out Example 8 using the IMC apparatus shown in FIG. 1. In this example, a mold having a shear edge structure was used which is capable of producing a case-like product having a height of 300 mm, a width of 210 mm, a depth of 50 mm and a thickness of 3 mm. Then, a mold closing force of 200 tons was applied to injection mold an amount of heat resistant ABS resin (commercially available under a trade name MX40, manufactured by Ube Cycon., Ltd.). At this time, the temperature of the resin was 250° C., while the temperature of the mold cavity of the mold was 90° C. Then, 30 seconds were needed in a cooling step involved in the resin molding process. When the surface temperature of the thermoplastic resin molded product arrived at 100° C., the mold was opened by 1 mm and kept at that position for 10 seconds. After that, 13 cc of a coating material listed in Table 7 was injected into the mold within a time period of 2 seconds. At this time, it was understood that the coating material was at a temperature of 100° C. and would be cured within one minute. Upon completion of the injection of the coating material, the mold was closed again with a mold closing force of 50 tons. After being kept at that position for 120 seconds, the mold was opened and an integrally formed product was taken out.

The integrally formed product has a coating layer of 100 μm formed over the entire surface thereof. An adhesion strength of the coating layer when it adheres to an integrally molded product was evaluated in a test called lattice pattern cellophane tape test prescribed in JIS K-5400 (General Testing Method for Coating Material). As a result, no peeling-off was found in the coating layer in 100 lattices of the lattice pattern, thereby proving that the obtained coating layer has a high adhesion strength.

In this example, an amount of internal heat within the molded resin product can be effectively used in the curing of a coating material, and it is possible to set the temperature of the mold at a low value. In this way, the mold temperature may be set lower than the curing temperature of a coating material, making it possible to shorten the manufacturing time period for one cycle of molding formation. Therefore, it is sure to continuously improve the productivity and to cure a coating material under a predetermined condition, thereby making it possible for a coating layer to obtain desired and predetermined characteristics.

TABLE 7

| Components of coating material A | Weight percent |
|---|---|
| Urethane acrylate oligomer | 100.0 |
| 1,6-hexan diol diacrylate | 65.0 |
| 8% cobalt octoate | 0.2 |
| Zinc stearate | 1.6 |
| Titanium dioxide | 150.0 |
| Carbon black | 0.1 |
| Bis-(4-t-butyl cyclohexyl) peroxy Carbonate | 3.0 |

*1 Urethane acrylate oligomer: Molecular weight; 2,500

INDUSTRIAL APPLICABILITY

In the in-mold coating formation method according to the first aspect of the present invention, since a time necessary for injecting a coating material and a time period from the beginning of injection of the coating material until the ending of a mold reclosing step can be set in accordance with a gel time of the coating material, it has become possible to effectively manufacture a coated product having a uniform quality in its outside appearance, whose cured coating layer is free from any defects such as pigment separation, weld lines, wrinkles and cracks.

In using the in-mold coating formation method and the in-mold coating formation apparatus according to the second aspect of the present invention, since the mold position and the mold closing force can all be controlled by the stroke pattern of the mold closing cylinder and can be subjected to a feedback control, it is possible to perform a continuous control without having to change a control object. Further, with the use of a toggle type injection molding machine, it is possible to control the position of the mold with a high speed and a high precision. In this way, it is sure to obtain a simplified control system and a high response capable of dealing with a sudden change in an operation pattern.

Further, according to this aspect of the present invention, by performing a feedback control in accordance with a predetermined coating material pressure pattern, even if an in-mold coating formation will be different from one shot to another, it is still possible for each coating layer to obtain a stabilized outside appearance and a stabilized adhesion strength. Moreover, with the use of a shear edge type mold which was often used to deal with SMC and BMC, even if only a feedback control of the mold closing force is performed without performing any other controls, it is still possible to obtain an integrally formed molded product coated with a coating layer having a sufficiently uniform and high adhesion strength.

Further, with the use of the in-mold coating formation mold and the in-mold coating formation method involving the use of such a mold, according to the third aspect of the present invention, since a coating material may be prevented from leaking to the outside of the mold, the molding formation cycle may be stabilized, thereby improving the productivity and maintaining product quality at a stabilized level. This effect is extremely larger than a minus effect caused due to an increased step of removing an auxiliary molded portion integrally formed with the molded resin main body.

Moreover, with the use of the in-mold coating formation method according to the fourth aspect of the present invention, since the coating material leakage from the mold cavity can be prevented and the in-mold pressure can be kept uniform with respect to the entire molded product and the entire coating layer, it is sure to obtain an integrally formed molded product coated with a layer having a sufficient adhesion strength. Further, by controlling a pressure applying pattern under a predetermined condition, the thickness of a coating layer may be controlled at a constant value, thereby effectively inhibiting the formation of humps on thick portions such as rib areas of the molded product. Moreover, with the use of the present invention, even if a coating material is a commonly used coating material and a molding resin is a usual grade resin, it is still possible to obtain a molded resin product coated with a coating layer having a sufficient adhesion strength. Therefore, it is allowed to save a lot of time and to avoid unnecessary expense which are otherwise needed for developing special coating material and special grade resin. In conclusion, with the use of the fourth aspect of the present invention, by employing only usual coating materials and usual resin to be used for moldings, it is sure to reduce the occurrence of defect products, increase the production efficiency, thereby improving the reliability and reducing the production cost.

In addition, with the use of the in-mold coating formation method according to the fifth aspect of the present invention, since it is allowed to effectively use an amount of heat held within a molded product, the temperature of the mold may be set at a value which is lower than the curing temperature of a coating material. As a result, it possible to shorten the molding formation cycle, thereby greatly improving the productivity. Meanwhile, since the curing process of a coating material may be carried out under a predetermined temperature condition which is higher than the temperature of the mold, it is possible for a coating layer to obtain desired characteristics. Further, if the temperature of a mold is set at the same value as in a prior art, it will be allowed to use a coating material having a higher curing temperature. In this way, a selectable range for selecting a coating material has become broader than before, making it possible to use various coating materials having an excellent heat resistance and weather resistance.

Therefore, with the use of the present invention, it has become possible to produce highly reliable products with a higher efficiency and a lower cost as compared with conventional methods.

The invention claimed is:

1. An in-mold coating formation method comprising: providing an in-mold coating formation mold, further comprising a male mold and female mold, defining the mold cavity, with parting surfaces that can be in a contacted position, a coating material injection device that is provided for injecting a coating material into a mold cavity in order that a coating layer can be formed on a surface of a thermoplastic resin molded product formed by virtue of the mold, and an auxiliary cavity in communication with the mold cavity of the mold through an entire circumference thereof and has a thickness of 0.1 mm to 2 mm and a length of 0.5 mm to 30 mm, said auxiliary cavity beginning at the parting surfaces of the male and female molds and ending at the beginning of the mold cavity formed between the male and female molds, and the auxiliary cavity having an end at a side opposite to the mold cavity and being formed such that parting surfaces of both male and female molds contact each other at the end of the auxiliary cavity during molding of the molded product and remain in contact during reopening of the male and female molds for charging the coating material; injecting a thermoplastic resin to form the thermoplastic resin molded product under a pressure sufficient to make the molten thermoplastic resin fill the auxiliary cavity completely, thereby forming an auxiliary molded body in the auxiliary cavity; and injecting the coating material to form the coating layer on the surface of the thermoplastic resin molded product; wherein an auxiliary molded body is formed by the resin to be used for molding injected into the auxiliary cavity, a small gap is formed because of a small shrinkage of the auxiliary molded body so that the small gap is located between the auxiliary molded body and the internal surface of the auxiliary cavity, said gap being used in preventing the coating material from flowing out of the mold.

2. An in-mold coating formation method according to claim 1, wherein a temperature of a cavity surface on the coating material injection side of the auxiliary cavity is kept higher than other parts of the mold, the coating material spread from the mold cavity surface is cured in the auxiliary cavity, thereby preventing the coating material from flowing out of the mold.

* * * * *